United States Patent [19]
Higashio

[11] Patent Number: 6,070,161
[45] Date of Patent: May 30, 2000

[54] METHOD OF ATTACHING KEYWORD OR OBJECT-TO-KEY RELEVANCE RATIO AND AUTOMATIC ATTACHING DEVICE THEREFOR

[75] Inventor: Kimihiko Higashio, Kobe, Japan

[73] Assignee: Minolta Co., Ltd., Osaka, Japan

[21] Appl. No.: 09/039,619

[22] Filed: Mar. 16, 1998

[30] Foreign Application Priority Data

| Mar. 19, 1997 | [JP] | Japan | 9-065998 |
| Apr. 4, 1997 | [JP] | Japan | 9-086854 |
| Jan. 26, 1998 | [JP] | Japan | 10-012558 |

[51] Int. Cl.[7] ................................ G06F 17/30
[52] U.S. Cl. .................. 707/4; 707/104; 707/3; 707/1
[58] Field of Search ................ 707/104, 4, 3, 707/1

[56] References Cited

U.S. PATENT DOCUMENTS

| 5,625,810 | 4/1997 | Kurosu et al. | 707/1 |
| 5,774,845 | 6/1998 | Ando et al. | 704/231 |
| 5,781,899 | 7/1998 | Hirata | 707/6 |
| 5,937,383 | 8/1999 | Ittycheriah et al. | 704/255 |

FOREIGN PATENT DOCUMENTS

| 63-204876A | 8/1988 | Japan | 17/30 |
| 4-120943 | 4/1992 | Japan | 17/30 |
| 4-225471 | 8/1992 | Japan | 17/30 |
| 5-242160 | 9/1993 | Japan . | |
| 5-242161 | 9/1993 | Japan . | |
| 5-274372 | 10/1993 | Japan . | |
| 6-215089 | 8/1994 | Japan . | |
| 7-143463 | 6/1995 | Japan | 17/30 |
| 7-160725 | 6/1995 | Japan . | |
| 10-320401 | 12/1997 | Japan | 17/30 |

*Primary Examiner*—Thomas G. Black
*Assistant Examiner*—Jean M. Corrielus
*Attorney, Agent, or Firm*—Morrison & Foerster LLP

[57] ABSTRACT

Keyword attachment is easily achieved in a short time. An automatic key attachment function deriving section derives an automatic key attachment function from an image quantity of a keyword attached to a designated reference image and a feature quantity of the reference image and stores the function into an automatic key attachment function storing section. A feature quantity calculating section of an image data registering section calculates the feature quantity of a registered image. A keyword estimating section obtains an image quantity from the calculated feature quantity and the automatic key attachment function, estimates the keyword based on this obtained image quantity and attaches the keyword to the registered image data. Thus by preparatorily registering the keyword into a keyword storing section together with the image quantity, the deriver of the automatic key attachment function and the attachment of the keyword to the registered image can be automatically executed, thereby allowing the keyword attachment to be easily achieved in a short time.

22 Claims, 14 Drawing Sheets

Fig. 8

| Image Data No. | Keyword | Image Quantity of Keyword | First Feature Quantity | Second Feature Quantity | Third Feature Quantity | Fourth Feature Quantity | Fifth Feature Quantity |
|---|---|---|---|---|---|---|---|
| 1 | Powerful | 2.00 | 8.00 | 5.00 | 10.00 | 4.00 | 20.00 |
| 2 | Tasteful | 8.00 | 5.00 | 3.00 | 12.00 | 8.00 | 0.00 |
| 3 | Gentle | 13.00 | 4.00 | 6.00 | 3.00 | 9.00 | 6.00 |
| 4 | Healthy | 9.00 | 5.00 | : | : | : | : |
| 5 | Sober | 7.00 | 5.00 | : | : | : | : |
| 6 | Stable | 1.00 | 10.00 | : | : | : | : |
| 7 | Restful | 3.00 | 8.00 | : | : | : | : |
| 8 | Youthful | 10.00 | 4.00 | : | : | : | : |
| 9 | Soft | 15.00 | 3.00 | : | : | : | : |
| 10 | Lovely | 14.00 | 3.00 | : | : | : | : |
| : | : | : | : | : | : | : | : |
| : | : | : | : | : | : | : | : |
| : | : | : | : | : | : | : | : |
| : | : | : | : | : | : | : | : |
| : | : | : | : | : | : | : | : |
| n | : | : | : | : | : | : | : |

METHOD OF ATTACHING KEYWORD OR OBJECT-TO-KEY RELEVANCE RATIO AND AUTOMATIC ATTACHING DEVICE THEREFOR

This application is based on applications No. 9-65998, 9-86854 and 10-12558 filed in Japan, the contents of which are hereby incorporated by reference.

TECHNICAL FIELD OF THE INVENTION

The present invention relates to a method and device of attaching a keyword or an object-to-key relevance ratio, and in particular, to a method and device for automatically attaching to an object a keyword or a relevance ratio of the object with respect to a key in storing the object with a key such as the keyword.

BACKGROUND OF THE INVENTION

With the rapid popularization of computers, electronic information to be handled by people is rapidly increasing. Such a vast amount of electronic information is generally stored individually with a keyword, and by designating this keyword, the desired electronic information can be retrieved.

As a method for attaching a keyword to such electronic information, there is a method disclosed in the document of Japanese Patent Laid-Open Publication No. HEI 6-295318.

However, according to the aforementioned prior art keyword attaching method, calculation of the fidelity based on the fidelity calculating information and comparison with the threshold value must be repeated by the number of the registered keyword candidates, and this leads to a problem that much time is required for the image data registering work. Furthermore, it is required to preparatorily set and register appropriate fidelity calculating information and threshold value for each keyword candidate, and this also leads to a problem that the structuring of a keyword attaching system is accompanied by a troublesome hard work although the keyword attaching work itself is automatically executed.

On the other hand, there is a popularized electronic filing device for taking in images and documents by means of an input device, registering and managing then together with attachment information of a keyword or the like, retrieving them at need and printing the same by means of an output device. In this case, the user is required to remember individually registered keywords for retrieval, and since the keyword varies depending on the subjectivities of individual users, it is impossible to retrieve all that have identical images or documents by only one keyword.

In this regard, there can be considered an information processing device which defines a relevance ratio of a key (impressive word, image keyword or the like) with respect to an image in an attempt at retrieving an image and a document by the images they have and retrieves an image close to the image conceived by the operator with the above key and relevance ratio used as retrieval conditions in the image retrieving stage.

However, this information processing device is required to preparatorily set the relevance ratio of each image to the key besides the key. Then, the key and the relevance ratio are to be manually set one by one by the user, and therefore, the setting can be repeated by the number of the objective images to be registered. When there is an increased number of objective images and keys to be registered, the image data registering work becomes very hard, to a disadvantage.

SUMMARY OF THE INVENTION

Accordingly, it is a first object of the present invention to provide a keyword attaching method capable of easily achieving keyword attachment in a short time and a keyword automatic attaching device using this keyword attaching method.

It is a second object of the present invention to provide an object-to-key relevance ratio attaching method capable of easily achieving the attachment of an object-to-key relevance ratio and an object-to-key relevance ratio automatic attaching device using this method.

In order to achieve the above first object, there is provided a keyword attaching method comprising registering a keyword and an image quantity obtained by numerically converting a linguistic sense of the keyword by a specified criterion into a keyword storing section with a correspondence provided between the keyword and the image quantity;

referring to an object to which the keyword is attached and deriving, from the image quantity of the keyword attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and estimating the keyword to be attached to the object to be registered referring to the keyword storing section based on the obtained image quantity; and storing into an object storing section the estimated keyword and the object to be registered with a correspondence provided between the keyword and the object.

According to the above construction, the relational expression of the keyword and the image quantity is derived referring to the object to which the keyword has been attached, and the keyword to be attached to the object to be registered is estimated on the basis of this derived relational expression, the feature quantity of the object to be registered and the keyword storing section. Therefore, by merely preparatorily registering the keyword and the image quantity of this keyword into the keyword storing section with a correspondence provided between them, the keyword is easily automatically attached to the object to be registered.

Furthermore, the processes of relational expression deriver, keyword estimation and so on are not required to be executed every keyword registered in the keyword storing section, and therefore, the automatic attachment of the keyword is achieved in a short time even though a great number of keywords are registered.

In an embodiment of the present invention, the relational expression is derived by a multivariate analysis using p feature quantities obtained for each of n objects to be referred to as explanatory variables and using image quantities of n keywords as an objective variable.

According to the above construction, the relational expression is easily derived by executing the multivariate analysis through microcomputer processing.

In order to achieve the above first object, there is provided a keyword automatic attaching device comprising:

a keyword storing section which registers therein a keyword and an image quantity obtained by numerically converting a linguistic sense of the keyword by a specified criterion with a correspondence provided between the keyword and the image quantity;

a relational expression deriving section which refers to an object to which a keyword is attached, derives, from the image quantity of the keyword attached to the object to be referred to and a feature quantity of the object to be referred to, a relational expression of the image quantity and the feature quantity and stores the derived relational expression into a relational expression storing section;

a feature quantity calculating section which calculates the feature quantity of the object to be registered;

a keyword estimating section which obtains the image quantity based on the calculated feature quantity and the relational expression and estimates a keyword to be attached to the object to be registered referring to the keyword storing section based on the obtained image quantity; and an object registering section which registers into an object storing section the estimated keyword and the object to be registered with a correspondence provided between the keyword and the object.

According to the above construction, the object to which the keyword has been already attached is referred to, and the relational expression of the image quantity and the feature quantity is derived by the relational expression deriving section. When newly registering an object, firstly the feature quantity of the object to be registered is calculated by the feature quantity calculating section. Next, the image quantity is obtained on the basis of the calculated feature quantity and the relational expression by the keyword estimating section, and the keyword storing section is referred to on the basic of this image quantity, so that the keyword to be attached is estimated. Thus, by merely registering the image quantity of the keyword and this keyword into the keyword storing section with a correspondence provided between them, the keyword is easily automatically attached to the object to be registered.

Furthermore, the processes of relational expression deriver, keyword estimation and so on are not required to be executed every keyword registered in the keyword storing section, and therefore, the automatic attachment of the keyword is achieved in a short time even though a great number of keywords are registered.

In an embodiment of the present invention, the relational expression deriving section derives the relational expression by a multivariate analysis using p feature quantities obtained for each of n objects to be referred to as explanatory variables and using image quantities of n keywords as an objective variable.

According to the above construction, the relational expression is easily derived by executing the multivariate analysis through microcomputer processing.

In order to achieve the above first object, there is provided a program storage medium storing therein an information processing program comprising:

registering a keyword and an image quantity obtained by numerically converting a linguistic sense of the keyword by a specified criterion into a keyword storing section with a correspondence provided between the keyword and the image quantity;

referring to an object to which the keyword is attached and deriving, from the image quantity of the keyword attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and estimating the keyword to be attached to the object to be registered referring to the keyword storing section based on the obtained image quantity; and storing into an object storing section the estimated keyword and the object to be registered with a correspondence provided between the keyword and the object.

According to the above construction, the relational expression of the keyword and the image quantity is derived referring to the object to which the keyword has been attached, and the keyword to be attached to the object to be registered can be estimated on the basis of this derived relational expression, the feature quantity of the object to be registered and the keyword storing section Therefore, by merely preparatorily registering the keyword the image quantity of this keyword into the keyword storing section with a correspondence provided between them, the keyword is easily automatically attached to the object to be registered.

In an embodiment of the present invention, the step of deriving the relational expression includes a step of executing a multivariate analysis using p feature quantities obtained for each of n objects to be referred to as explanatory variables and using image quantities of n keywords as an objective variable.

According to the above construction, the relational expression of the image quantity and the feature quantity is easily derived by the multivariate analysis.

In order to achieve the above first object, there is provided a program storage medium storing therein an information processing program comprising registering a keyword and an image quantity obtained by numerically converting a linguistic sense of the keyword by a specified criterion into a keyword storing section with a correspondence provided between the keyword and the image quantity;

referring to an object to which the keyword is attached and deriving, from the image quantity of the keyword attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and estimating the keyword to be attached to the object to be registered referring to the keyword storing section based on the obtained image quantity; and storing into an object storing section the estimated keyword and the object to be registered with a correspondence provided between the keyword and the object.

According to the above construction, the relational expression of the keyword and the image quantity is derived referring to the object to which the keyword has been attached, and the keyword to be attached to the object to be registered can be estimated on the basis of this derived relational expression, the feature quantity of the object to be registered and the keyword storing section. Therefore, by merely preparatorily registering the keyword and the image quantity of this keyword into the keyword storing section with a correspondence provided between them, the keyword is easily automatically attached to the object to be registered.

In an embodiment of the present invention, the relational expression is derived by a multivariate analysis using p feature quantities obtained for each of n objects to be referred to as explanatory variables and using image quantities of n keywords as an objective variable.

According to the above construction, the relational expression of the image quantity and the feature quantity is easily derived by the multivariate analysis.

In order to achieve the above second object, there is provided an object-to-key relevance ratio attaching method comprising:

registering a key and an image quantity obtained by numerically converting a linguistic sense of the key by a specified criterion into a key storing section with a correspondence provided between the key and the image quantity;

referring to an object to which the key is attached and deriving, from the image quantity of the key attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression calculating a relevance ratio of the object to be registered with respect to an already registered key referring to the key storing section based on the obtained image quantity; and storing into an object storing section the calculated relevance ratio and the object to be registered with a correspondence provided between the relevance ratio and the object.

According to the above arrangement, the relational expression of the image quantity of the key and the feature quantity of the object is derived referring to the object to which the key is attached, and the relevance ratio of the object to be registered with respect to each key that has been already registered is calculated based on this derived relational expression, the feature quantity of the object to be registered and the key storing section. Therefore, by merely preparatorily registering the key and the image quantity of this key into the key storing section with a correspondence provided between them, the relevance ratio of the object to be registered with respect to the already registered key is easily automatically attached to the object to be registered.

In an embodiment of the present invention, the relational expression is derived by a multivariate analysis using p feature quantities obtained for each of n objects to be referred to as explanatory variables and using image quantities of n keys as an objective variable.

According to the above construction, the relational expression is easily derived by executing the multivariate analysis through microcomputer processing.

In order to achieve the above second object, there is provided an object-to-key relevance ratio automatic attaching device comprising:

a key storing section which registers therein a key and an image quantity obtained by numerically converting a linguistic sense of the key by a specified criterion with a correspondence provided between the key and the image quantity;

a relational expression deriving section which refers to an object already registered, derives, from attachment information of the object to be referred to and a feature quantity of the object to be referred to, a relational expression of the image quantity and the feature quantity and stores the derived relational expression into a relational expression storing section;

a feature quantity calculating section which calculates the feature quantity of the object to be registered;

a relevance ratio calculating section which obtains the image quantity based on the calculated feature quantity and the relational expression and calculates a relevance ratio of the object to be registered with respect to the already registered key referring to the key storing section based on the obtained image quantity; and an object registering section which registers into an object storing section the calculated relevance ratio and the object to be registered with a correspondence provided between the relevance ratio and the object.

According to the above construction, the already registered object is referred to, and the relational expression of the image quantity and the feature quantity is derived by the relational expression deriving section. When newly registering an object, firstly the feature quantity of the object to be registered is calculated by the feature quantity calculating section. Next, the image quantity is obtained on the basis of the calculated feature quantity and the relational expression by the relevance ratio calculating section, and the key storing section is referred to on the basis of this image quantity, so that the relevance ratio of the object to be registered with respect to the already registered key is calculated. Thus, by merely registering the image quantity of the key and this key into the key storing section with a correspondence provided between them, the relevance ratio of the object to be registered with respect to the already registered key is easily automatically attached to the object to be registered.

In an embodiment of the present invention, the relational expression deriving section derives the relational expression by a multivariate analysis using p feature quantities obtained for each of n objects to be referred to as explanatory variables and using image quantities of n keys as an objective variable.

According to the above construction, the relational expression is easily derived by executing the multivariate analysis through microcomputer processing.

In order to achieve the above second object, there is provided a program storage medium storing therein an information processing program comprising:

registering a key and an image quantity obtained by numerically converting a linguistic sense of the key by a specified criterion into a key storing section with a correspondence provided between the key and the image quantity;

referring to an object to which the key is attached and deriving, from the image quantity of the key attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and calculating a relevance ratio of the object to be registered with respect to an already registered key referring to the key storing section based on the obtained image quantity; and storing into an object storing section the calculated relevance ratio and the object to be registered with a correspondence provided between the relevance ratio and the object.

According to the above construction, the relational expression of the image quantity of the key and the feature quantity is derived referring to the object to which the key is attached, and the relevance ratio of the object to be registered with respect to each already registered key is calculated based on this derived relational expression, the feature quantity of the object to be registered and the key storing section. Therefore, by merely preparatorily registering the key and the image quantity of this key into the key storing section with a correspondence provided between them, the relevance ratio of the object to be registered and the already registered key is easily automatically attached to the object to be registered.

In an embodiment of the present invention, the step of deriving the relational expression includes a step of executing a multivariate analysis using p feature quantities obtained for each of n objects to be referred to as explanatory variables and using image quantities of n keys as an objective variable.

According to the above construction, the relational expression of the image quantity and the feature quantity is easily derived by the multivariate analysis.

In order to achieve the above second object, there is provided a program storage medium storing therein an information processing program comprising:

registering a key and an image quantity obtained by numerically converting a linguistic sense of the key by a specified criterion into a key storing section with a correspondence provided between the key and the image quantity;

referring to an object to which the key is attached and deriving, from the image quantity of the key attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and calculating a relevance ratio of the object to be registered with respect to an already registered key referring to the key storing section based on the obtained image quantity; and storing into an object storing section the calculated relevance ratio and the object to be registered with a correspondence provided between the relevance ratio and the object.

According to the above construction, the relational expression of the image quantity of the key and the feature quantity is derived referring to the object to which the key is attached, and the relevance ratio of the object to be registered with respect to each already registered key is calculated based on this derived relational expression, the feature quantity of the object to be registered and the key storing section. Therefore, by merely preparatorily registering the key and the image quantity of this key into the key storing section with a correspondence provided between them, the relevance ratio of the object to be registered and the already registered key is easily automatically attached to the object to be registered.

In an embodiment of the present invention, the relational expression is derived by a multivariate analysis using p feature quantities obtained for each of n objects to be referred to as explanatory variables and using image quantities of n keys as an objective variable.

According to the above construction, the relational expression of the image quantity and the feature quantity is easily derived by the multivariate analysis.

In order to achieve the above second object, there is provided an object-to-key relevance ratio attaching method comprising:

deriving, from a feature quantity of an object to which a key is attached and an image quantity of the key attached to this object, a relational expression of the image quantity and the feature quantity;

calculating a relational expression of the object and the key based on the derived relational expression; and calculating a relevance ratio of the object with respect to the key based on the calculated relational expression and storing into an object storing section the calculated relevance ratio and the object with a correspondence provided between the relevance ratio and the object.

In an embodiment of the present invention, the relational expression is derived by a multivariate analysis using p feature quantities obtained for each of n objects to be referred to as explanatory variables and using image quantities of n keys as an objective variable.

In order to achieve the above second object, there is provided an object-to-key relevance ratio attaching device comprising:

a relational expression deriving section which derives, from a feature quantity of an object to which a key is attached and an image quantity obtained by numerically converting the key attached to the object, a relational expression of the image quantity and the feature quantity and stores the derived relational expression into a relational expression storing section;

a relevance ratio calculating section which calculates a relevance ratio of the object with respect to the key based on the derived relational expression; and an object registering section which registers into an object storing section the calculated relevance ratio and the object with a correspondence provided between the relevance ratio and the object.

In an embodiment of the present invention, the relational expression deriving section derives the relational expression by a multivariate analysis using p feature quantities obtained for each of n objects as explanatory variables and using image quantities of n keys as an objective variable.

In order to achieve the above second object, there is provided a program storage medium storing therein an information processing program comprising:

deriving, from a feature quantity of an object to which a key is attached and an image quantity obtained by numerically converting the key attached to the object, a relational expression of the image quantity and the feature quantity;

calculating a relational expression of the object and the key based on the derived relational expression; and calculating a relevance ratio of the object with respect to the key based on the calculated relational expression and storing into an object storing section the calculated relevance ratio and the object with a correspondence provided between the relevance ratio and the object.

In an embodiment of the present invention, the step of deriving the relational expression includes a step of executing a multivariate analysis using p feature quantities obtained for each of n objects as explanatory variables and using image quantities of n keys as an objective variable.

It is to be herein noted that the aforementioned "object" means electronic information (for example, text data, image data and sound data) which is to be the subject to be stored by an information processing device such as a retrieving device or a folder or the like in which these pieces of information are collected.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a table showing an example of an image quantity and a feature quantity obtained through the automatic key attachment function deriving process shown in FIG. 7;

DETAILED DESCRIPTION OF THE PREFERRED EMBODIMENTS

The present invention will be described in detail below based on the embodiments thereof with reference to the accompanying drawings.

Figure 1:
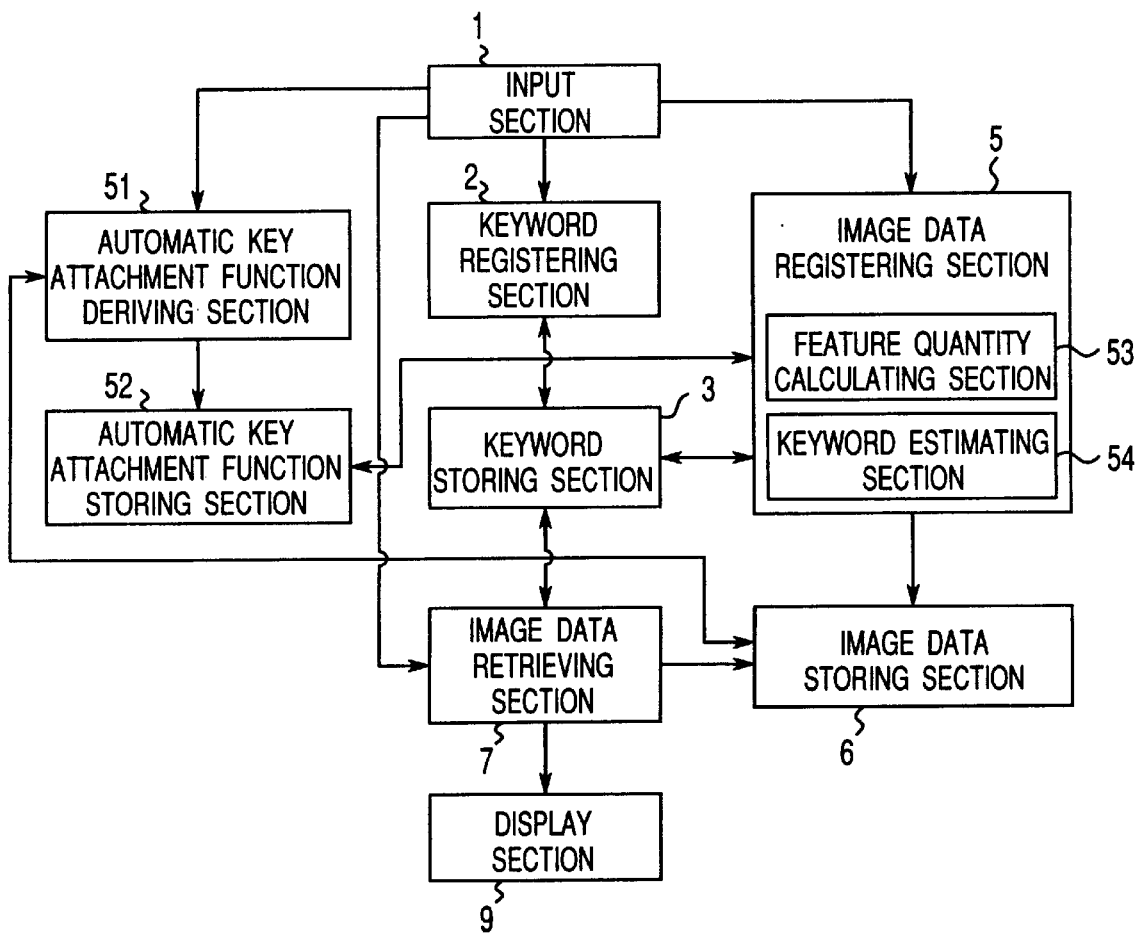
FIG. 1 is a functional block diagram of a retrieving device mounted with a keyword automatic attaching device according to an embodiment of the present invention.

FIG. 1 is a functional block diagram of a retrieving device mounted with a keyword automatic attaching device according to an embodiment of the present invention. In the present embodiment, image data is used as the aforementioned "object".

Image data is input via input section 1 and stored into an image data storing section 6, retrieval conditions, a variety of instructions and so on. A keyword registering section 2 registers therein a keyword which is one of the retrieval conditions inputted from the input section 1 and an image quantity, which will be described in detail later, into a keyword storing section 3 with a correspondence provided between them.

An automatic key attachment function deriving section 51 derives a function for automatically executing keyword attachment (i.e., for executing an automatic key attaching process) in a manner as described later (the function referred to as an automatic key attachment function hereinafter) based on the keyword attached to the image data of a reference image designated from the input section 1 and stores the function into an automatic key attachment function storing section 52.

An image data registering section 5 registers the image data inputted from the input section 1 into an image data storing section 6 with a keyword automatically attached to the image.

The image data registering section 5 has a feature quantity calculating section 53 and a keyword estimating section 54. The feature quantity calculating section 53 calculates the feature quantity of the image based on the image data inputted from the input section 1. Then, the keyword estimating section 54 estimates the keyword of the image based on the calculated feature quantity and the automatic key attachment function.

An image data retrieving section 7 retrieves image data suited to the retrieval conditions from the image data registered in the image data storing section 6 with the keyword set from the input section 1 used as a retrieval condition. Then, based on the image data of the retrieved candidate image, the candidate image is displayed on a display section 9.

It is to be noted that the display of menu screens and so on other than the candidate image is executed by a display processing section (not shown) different from an image data retrieving section 7.

That is, in the present embodiment, the image data registering section 5 constitutes the object registering section, the automatic key attachment function deriving section 51 constitutes the relational expression deriving section and the automatic key attachment function storing section 52 constitutes the relational expression storing section.

Figure 2:
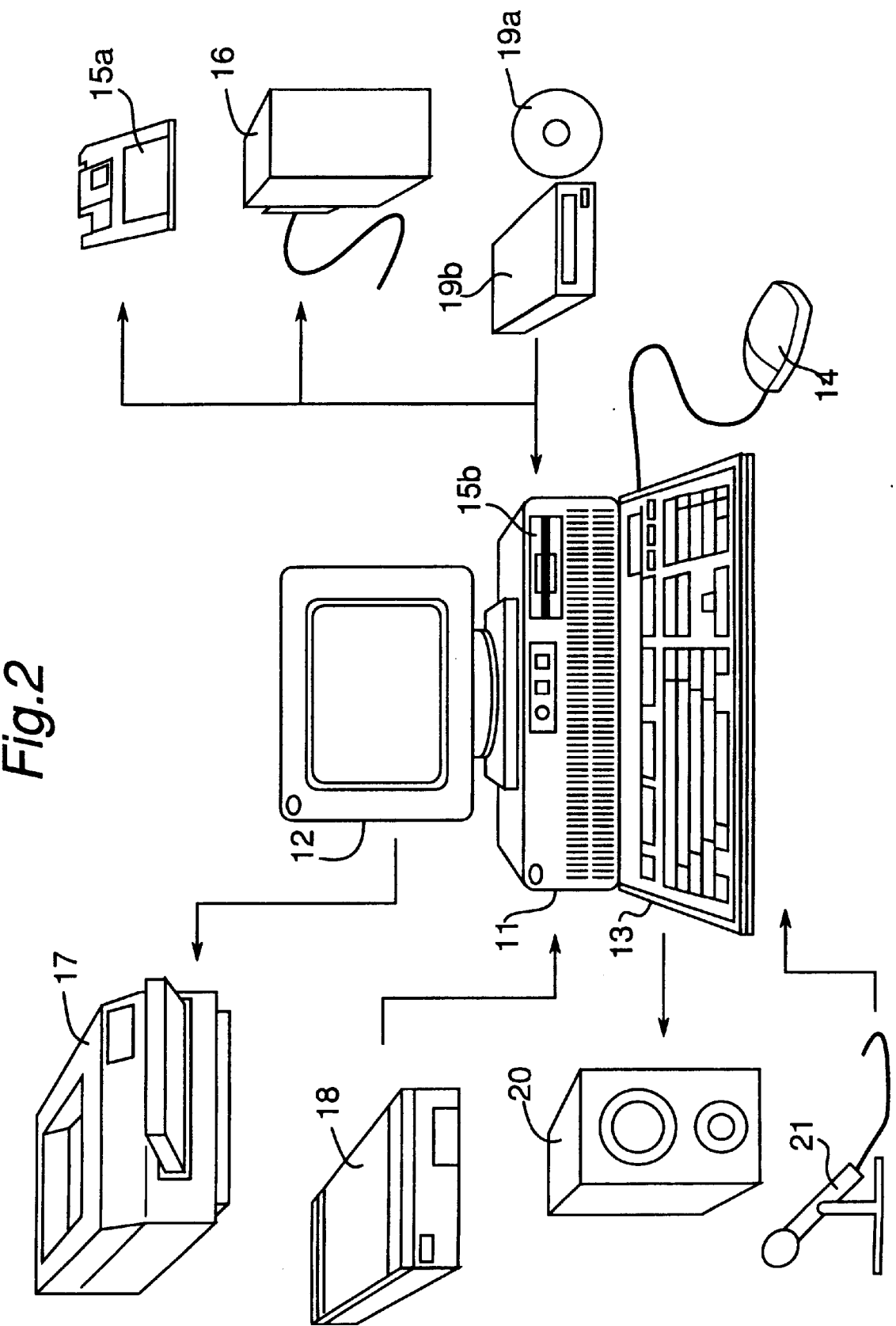
FIG. 2 is a diagram showing the device construction for implementing the function shown in FIG. 1.
Figure 3:
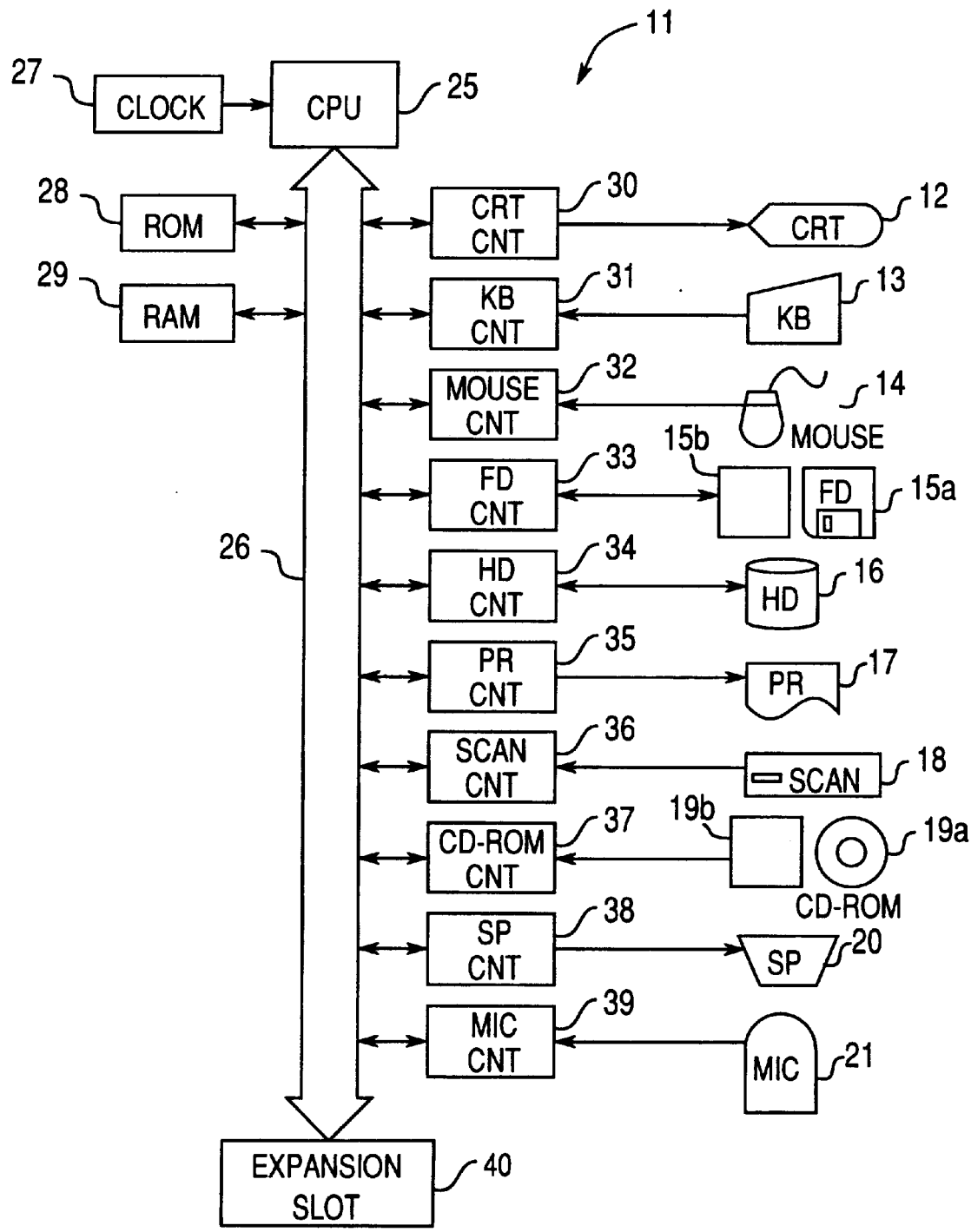
FIG. 3 is a block diagram showing a CPU and peripherals of hardware for implementing the function shown in FIG. 1.

FIG. 2 and FIG. 3 are diagrams showing a hardware construction for implementing the functions shown in FIG. 1.

As shown in FIG. 2, the present retrieving device includes mainly a control unit 11 which is mounted with a CPU (Central Processing Unit) and controls the operation of the whole retrieving device as well as its peripherals of a CRT (Cathode Ray Tube) 12, a keyboard 13, a mouse 14, a floppy disk drive 15b, a hard disk unit 16, a printer 17, a scanner 18, a CD-ROM drive 19b, a loudspeaker 20, a microphone 21 and so on.

The CRT 12 displays thereon a variety of information necessary for the manipulation of the retrieved image, literal information and so on. The keyboard 13 and the mouse 14 are used for a variety of input operations and designating operations. A floppy disk 15a is set in the floppy disk drive 15b of the control unit 11 and used for storing and reproducing data. The hard disk unit 16 stores therein image data and keywords. The printer 17 outputs an image based on the image data, a drawing formed through image editing or the like onto a paper sheet. The scanner 18 reads the image on a sheet-shaped document and outputs image data. A CD-ROM 19a stores therein image data in a specified format and is set in the CD-ROM drive 19b so as to reproduce the image data. The loudspeaker 20 produces a sound output, while the microphone 21 executes a sound input. In this case, image data read by the scanner 18 and the CD-ROM drive 19b are stored into the hard disk unit 16.

It is to be noted that the scanner 18, CD-ROM drive 19b, loudspeaker 20, and microphone 21 may be integrated with the control unit 11 as built-in units.

FIG. 3 is a block diagram showing the CPU mounted in the control unit 11 and its peripherals shown in FIG. 2.

The CPU 25 is provided by, for example, the model of i80486DX produced by Intel Corporation or the like. The CPU 25 is connected via a data bus 26 to a ROM (Read Only Memory) 28 in which a program for controlling the present retrieving device is stored, a RAM (Random Access Memory) 29 in which various data and the program are stored, a display control circuit 30 which displays thereon an image, letters and the like on the CRT 12, a keyboard control circuit 31 which transfers and controls an input from the keyboard 13, a mouse control circuit 32 which transfers and controls an input from the mouse 14, a floppy disk drive control circuit 33 which controls the floppy disk drive 15b, a hard disk control circuit 34 which controls the hard disk unit 16, a printer control circuit 35 which controls the output operation of the printer 17, a scanner control circuit 36 which controls an image input operation of the scanner 18, a CD-ROM drive control circuit 37 which controls the CD-ROM drive 19b, a loudspeaker controlling section 38 which controls the sound output of the loudspeaker 20 and a microphone control circuit 39 which controls the sound input from the microphone 21.

The CPU 25 is also connected to a clock 27 for generating a reference clock necessary for operating the present retrieving device and further to an expansion slot 40 for connecting a variety of expansion boards via the data bus 26.

In this case, it is acceptable to connect a SCSI board to the expansion slot 40 and connect the floppy disk drive 15b, hard disk unit 16, scanner 18, CD-ROM drive 19b and so on via this SCSI board.

That is, in the present embodiment, the input section 1 is constructed of the keyboard 13, mouse 14, hard disk unit 16, scanner 18 and CD-ROM drive 19b, the image data storing section 6 is constructed of the floppy disk 15a and hard disk unit 16, the keyword storing section 3 and the automatic key attachment function storing section 52 are constructed of the RAM 29, the display section 9 is constructed of the CRT 12, and the keyword registering section 2, image data registering section 5, image data retrieving section 7 and automatic key attachment function deriving section 51 are constructed of the CPU 25.

Although the image data storing section 6 is constructed of the floppy disk 15a and the hard disk unit 16 as described above in the present embodiment, it is acceptable to use another recording medium such as a magneto-optic disk unit. Although the image data input section of the input section 1 is constructed of the hard disk unit 16, scanner 18 and CD-ROM drive 19b, it is acceptable to use another input device such as a still video camera or a digital camera. It is also acceptable to use another output device such as a digital copying machine in place of the printer 17.

In the present retrieving device, the programs of an image data registering process, a keyword registering process, an automatic key attachment function deriving process and so on are stored in the ROM 28. However, it is acceptable to store part or all of the above-mentioned programs in an external storage medium such as the floppy disk 15a or the hard disk unit 16 and read the same into the RAM 29 at need.

The retrieving device having the above construction operates as follows.

Figure 4:
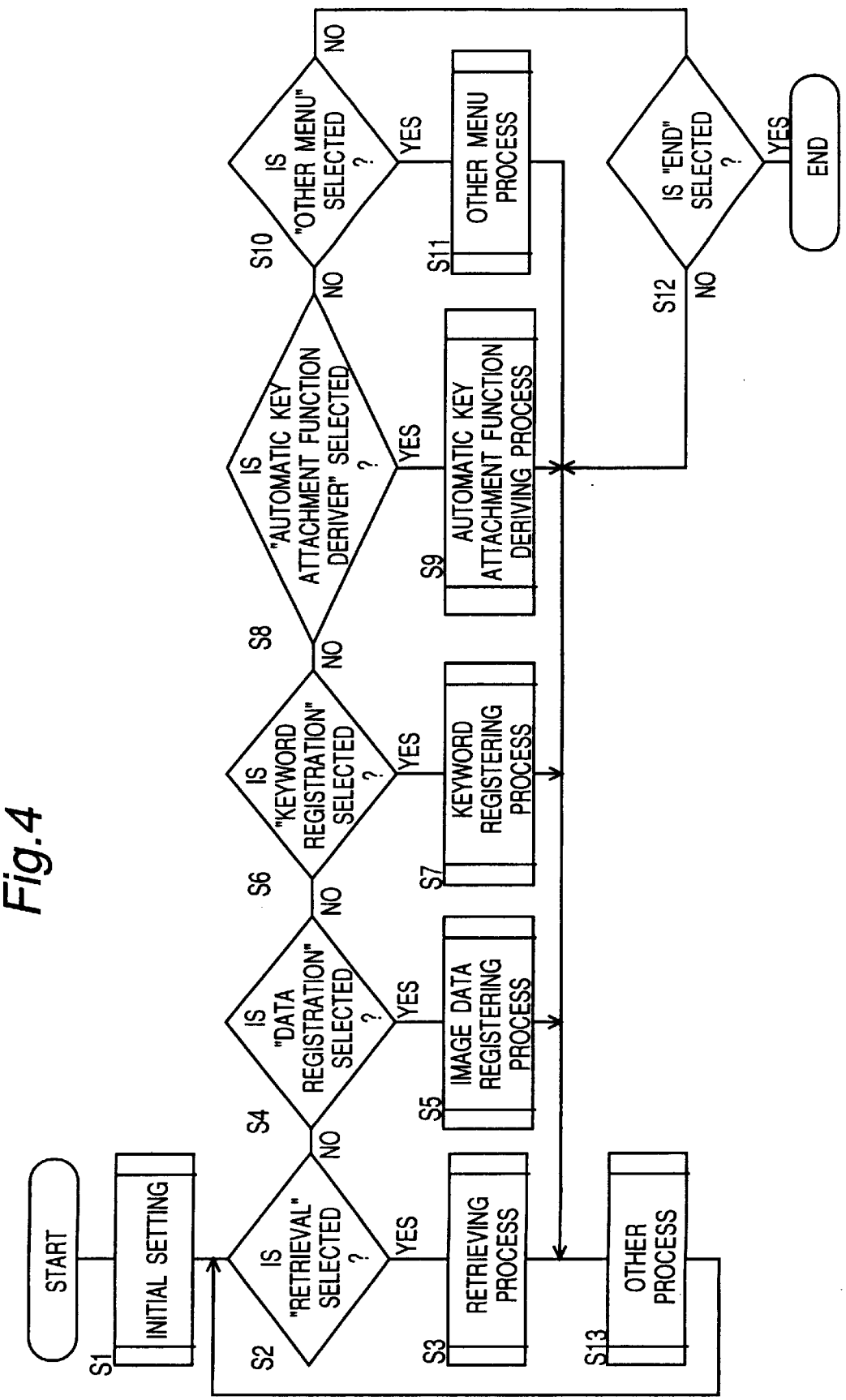
FIG. 4 is a flowchart of a fundamental processing operation to be executed under the control of the CPU shown in FIG. 3.

FIG. 4 is a flowchart of a fundamental processing operation to be executed under the control of the CPU 25 based on the program stored in the ROM 28. The fundamental processing operation of the present retrieving device will be described below with reference to FIG. 1 and FIG. 4.

When the present retrieving device is supplied with a power to start the program, the fundamental processing operation starts.

In step S1, initial setting processes of initializing flags and registers required for the subsequent processes, displaying an initial screen on the display section 9 and so on are executed.

When it is decided in step S2 that a job menu "retrieval" is selected from the initial screen displayed on the display section 9, the program flow proceeds to Step S3. Otherwise, the program flow proceeds to Step S4.

In step S3, a retrieving process of retrieving the desired image data from the image data storing section 6 and displaying the image on the display section 9 is executed according to the selected job menu "retrieval". Thereafter, the program flow proceeds to Step S13. It is to be noted that the above retrieval process is executed by the image data retrieving section 7.

When it is decided in step S4 that a job menu "data registration" is selected from the initial screen displayed on the display section 9, the program flow proceeds to Step S5. Otherwise, the program flow proceeds to Step S6.

In step S5, an image data registering process of taking in the image data inputted from the input section 1, attaching a keyword to this image data and registering the data into the image data storing section 6 is executed according to the selected job menu "data registration". Thereafter, the program flow proceeds to Step S13. It is to be noted that the image data registering process is executed by the image data registering section 5.

When it is decided in step S6 that a job menu "keyword registration" is selected from the initial screen displayed on the display section 9, the program flow proceeds to Step S7. Otherwise, the program flow proceeds to Step S8.

In step S7, a keyword registering process of registering the keyword inputted from the input section 1 into the keyword storing section 3 together with the aforementioned image quantity is executed according to the selected job menu "keyword registration". Thereafter, the program flow proceeds to Step S13. It is to be noted that the keyword registering process is executed by the keyword registering section 2.

When it is decided in step S8 that a job menu "automatic key attachment function deriver" is selected from the initial screen displayed on the display section 9, the program flow proceeds to Step S9. Otherwise, the program flow proceeds to Step S10.

In step S9, an automatic key attachment function deriving process for deriving the automatic key attachment function is executed according to the selected job menu "automatic key attachment function deriver". Thereafter, the program flow proceeds to Step S13. It is to be noted that the automatic key attachment function deriving process is executed by the automatic key attachment function deriving section 51.

When it is decided in step S10 that a job menu "other menu" is selected from the initial screen displayed on the display section 9, the program flow proceeds to Step S11. Otherwise, the program flow proceeds to Step S12.

In step S11, an other menu processing of printing out of the retrieved image or the like is executed according to the selected job menu "other menu". Thereafter, the program flow proceeds to Step S13.

It is decided in step S12 whether or not "end" is selected from the initial screen displayed on the display section 9. Consequently, when "end" is selected, the fundamental processing operation ends. Otherwise, the program flow proceeds to Step S13.

In step S13, another processing is executed. Thereafter, the program flow returns to step S2 and proceeds to the next menu processing.

When "end" is selected in step S12, the fundamental processing operation ends.

The "keyword registering process", "automatic key attachment function deriving process" and "image data registering process" will be described in detail below. It is to be noted that the "retrieving process" and "other menu process" and so on are not directly related to this invention, and therefore, no detailed description will be provided for them.

Figure 5:
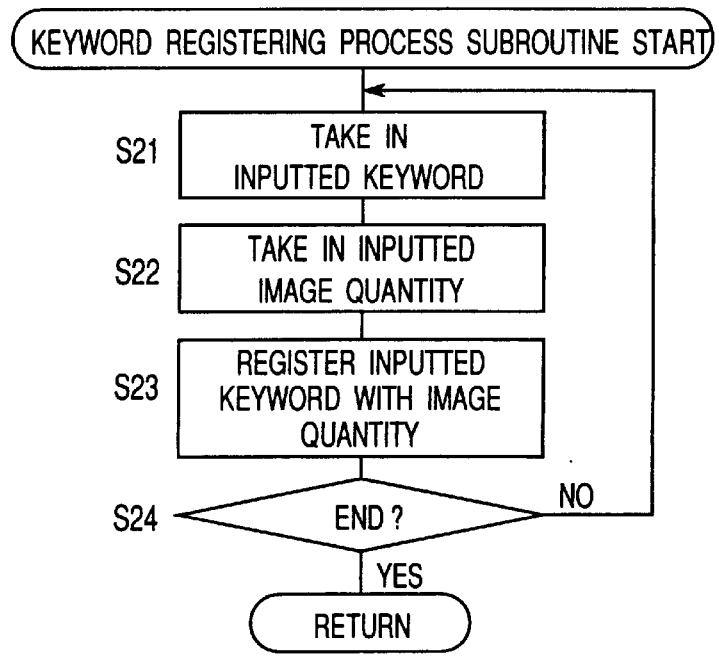
FIG. 5 is a flowchart of a keyword registering process subroutine to be executed by a keyword registering section as shown in FIG. 1.

FIG. 5 is a flowchart of a keyword registering process subroutine to be executed by the keyword registering section 2 in step S7 of the fundamental processing operation shown in FIG. 4. The keyword registering process operation will be described in detail below with reference to FIG. 5.

When it is decided that the job menu "keyword registration" is selected in step S6 of the main routine of the fundamental processing operation, the keyword registering process subroutine starts.

In step S21, the keyword inputted from the input section 1 is taken in.

In step S22, the image quantity inputted from the input section 1 is taken in.

Figure 6:
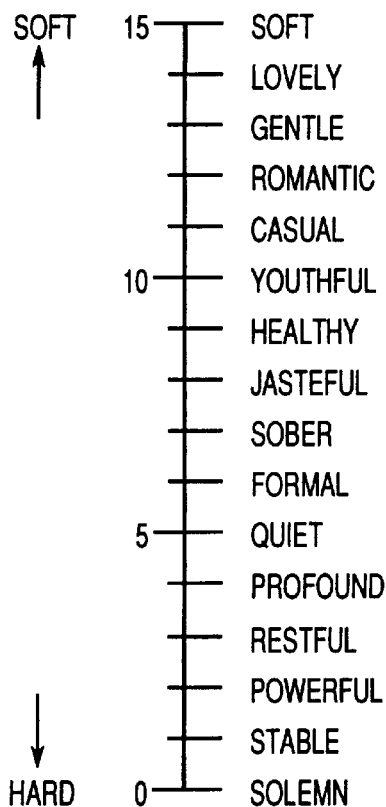
FIG. 6 is an explanatory view of an image quantity.

In this case, the image quantity is a value obtained by numerically converting the linguistic sense of a keyword by a specified criterion. For example, FIG. 6 is the results of numerically converting the linguistic senses of 16 kinds of keywords by a criterion of "hard: 0⇌soft: 15", according to which the image quantity of a keyword "romantic" is numerically converted to "12" and the image quantity of a keyword "profound" is numerically converted to "4".

In step S23, the inputted keyword is registered into the keyword storing section 3 while being provided with a correspondence to the concurrently inputted image quantity.

In step S24, it is decided whether or not the keyword registering process is to be ended interactively with the user. Consequently, when the process is not to end, the program flow returns to step S21 and proceeds to the next keyword registration. When the process is to end, the keyword registering process subroutine ends and the program flow returns to the main routine of the fundamental processing operation shown in FIG. 4.

By thus defining the image quantity for the keyword to be registered into the keyword storing section 3, a keyword appropriate for this registration image can be estimated from the feature quantity of the registration image by providing a correspondence between the feature quantity of the image and the image quantity of the keyword as described in detail later.

It is to be noted that the image quantity shown in FIG. 6 is a mere example, and the image quantities of various keywords are set by various criteria in a similar manner.

Figure 7:
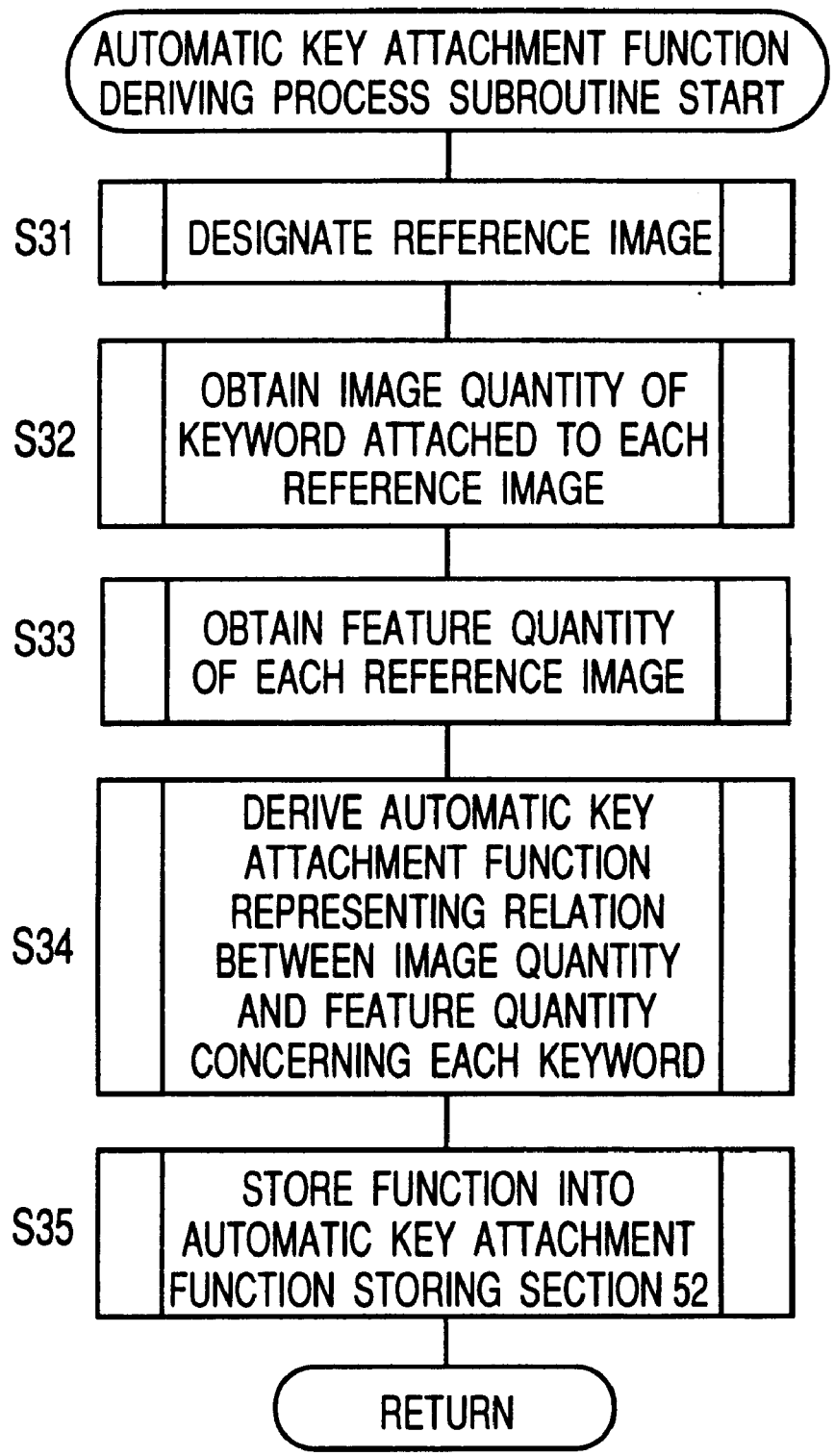
FIG. 7 is a flowchart of an automatic key attachment function deriving process subroutine to be executed by an automatic key attachment function deriving section as shown in FIG. 1.

FIG. 7 is a flowchart of an automatic key attachment function deriving process subroutine to be executed by the automatic key attachment function deriving section 51 in step S9 of the fundamental processing operation shown in FIG. 4. The automatic key attachment function deriving process operation will be described in detail below with reference to FIG. 1 and FIG. 7.

When it is decided that the job menu "automatic key attachment function deriver" is selected in step S8 of the main routine of the fundamental processing operation shown in FIG. 4, the automatic key attachment function deriving process subroutine starts.

In step S31, an image to be referred to (referred to as a reference image hereinafter) is designated from the image data registered in the image data storing section 6 interactively with the user.

This reference image designating method is not specifically limited, and for example, it is proper to display the image data names of all the image data registered in the image data storing section 6 in a list form on the display section 9 and designate one from the input section 1.

In step S32, the image data storing section 6 is referred to, and the keyword attached to the designated reference image is read. Then, the keyword storing section 3 is referred to, and the image quantity of the read keyword is obtained.

In step S33, the feature quantity of the designated reference image is obtained. As the feature quantity in this case, there can be enumerated a variety of feature quantities of, for example, the feature quantities concerning the color of brightness, hue, chroma and so on and feature quantities concerning the contour features or shape features of straight line content, circular shape content and so on, however, the feature quantity is not specifically limited.

In step S34, with regard to each keyword read in step S32, an automatic key attachment function that is a relational expression of the image quantity obtained in step S32 and the feature quantity obtained in step S33 is derived by a multivariate analysis. It is to be noted that the above multivariate analysis is not specifically limited and exemplified by a multiple regression analysis or the like. It is to be noted that this automatic key attachment function deriver is executed every image quantity of an identical criterion.

In step S35, the automatic key attachment function derived as above is stored into the automatic key attachment function storing section 52.

Thereafter, the automatic key attachment function deriving process subroutine ends, and the program flow returns to the main routine of the fundamental processing operation shown in FIG. 4.

A concrete example of deriving the automatic key attachment function by the multiple regression analysis will be described below.

FIG. 8 shows image quantities obtained from n reference images in step S32 of the automatic key attachment function deriving process subroutine and p (=5) feature quantities obtained for each of the same n reference images in step S33. For example, a keyword "powerful" is attached to the image data of the first reference image, and the image quantity of this keyword "powerful" is "2.00 (see FIG. 6)". Further, the five feature quantities of the first reference image obtained on the basis of the image data are "8.00", "5.00", "10.00", "4.00" and "20.00", respectively.

Then, a multiple regression analysis is executed by using the thus-obtained n image quantities as an objective variable y, using n first feature quantities as an explanatory variable $x_1$, using n second feature quantities as an explanatory variable $x_2$, using n third feature quantities as an explanatory variable $x_3$, using n fourth feature quantities as an explanatory variable $x_4$ and using n fifth feature quantities as an explanatory variable $X_5$, thereby obtaining a multiple regression equation:

$$y = a_0 + a_1 x_1 + a_2 x_2 + a_3 x_3 + a_4 x_4 + a_5 x_5$$

and using this as the automatic key attachment function. It is to be noted that $a_0$, $a_1$, $a_2$, $a_3$, $a_4$ and $a_5$ are regression coefficients.

In a case where a correlation coefficient $\gamma$ is degraded (for example, $\gamma < 0.75$), it is acceptable to issue a warning of the fact and urge the operator to change the reference image or display the impossibility of automatic key attachment function deriver.

Figure 9:
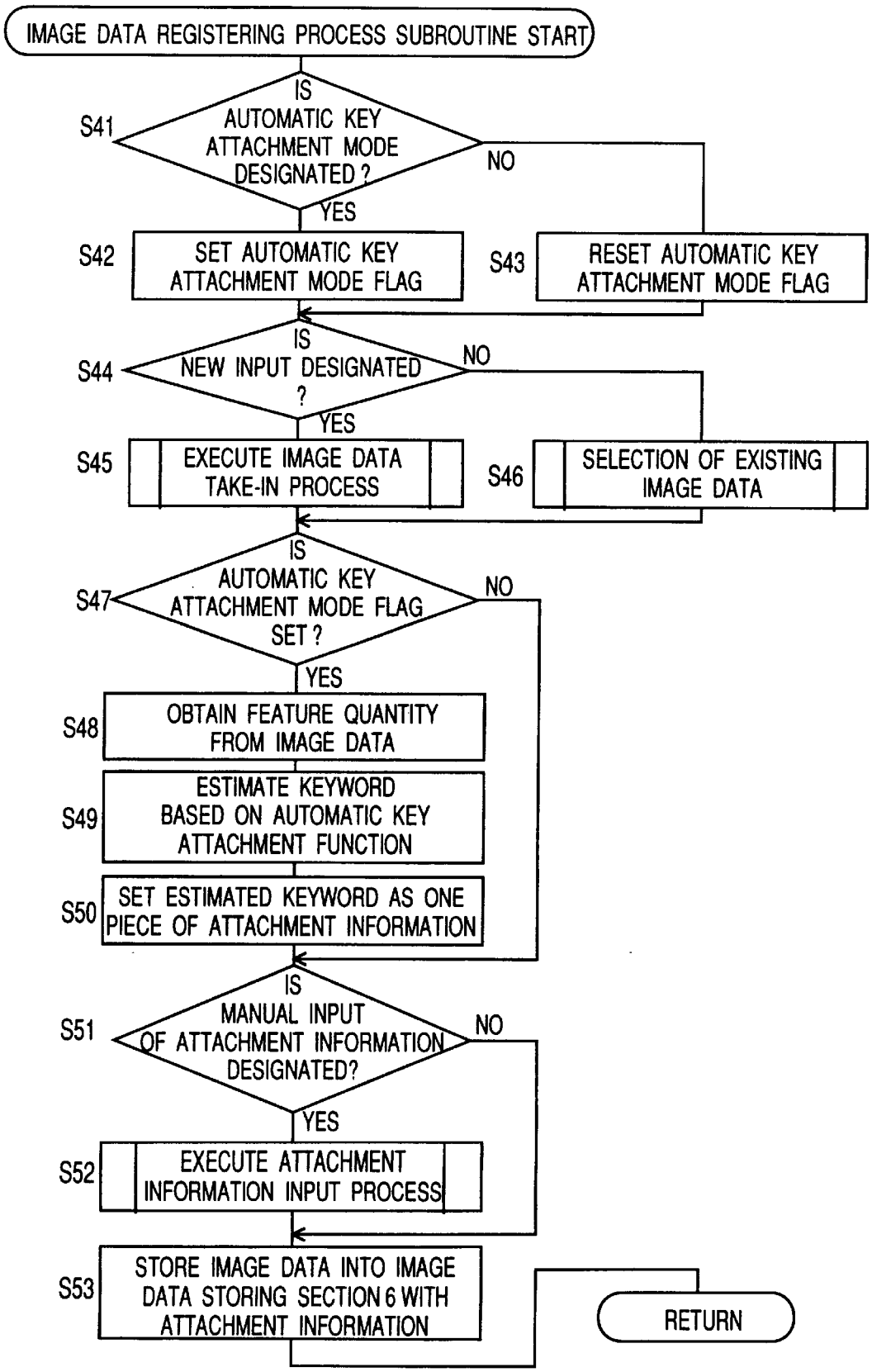
FIG. 9 is a flowchart of an image data registering process subroutine to be executed by an image data registering section as shown in FIG. 1.

FIG. 9 is a flowchart of an image data registering process subroutine to be executed by the image data registering section 5 having the feature quantity calculating section 53 and the keyword estimating section 54 in step S5 of the fundamental processing operation shown in FIG. 4. The image data registering process operation will be described in detail below with reference to FIG. 9.

When it is decided that the job menu "data registration" is selected in step S4 of the main routine of the fundamental processing operation shown in FIG. 4, the image data registering process subroutine starts.

It is decided in step S41 whether or not an "automatic key attachment model" is designated by the user from the input section 1. Consequently, when it is designated, the program flow proceeds to Step S42. When it is not designated, the program flow proceeds to Step S43.

In step S42, an automatic key attachment mode flag is set. Thereafter, the program flow proceeds to Step S44.

In step S43, the automatic key attachment mode flag is reset.

It is decided in step S44 whether or not a "new input" for newly registering image data is designated by the user from the input section 1. Consequently, when it is designated, the program flow proceeds to Step S45. When it is not designated, the program flow proceeds to Step S46.

In step S45, an image data take-in process as described in detail later is executed. Thereafter, the program flow proceeds to Step S47.

In step S46, the existing image data is selected and read.

It is decided in step S47 whether or not the automatic key attachment mode flag is set. Consequently, when it is set, the program flow proceeds to Step S48. When it is not set, the program flow proceeds to Step S51.

In step S48, a feature quantity is obtained by the feature quantity calculating section 53 from the new image data taken in in step S45 or the existing image data read in step S46.

It is to be noted that the above feature quantity is the same feature quantity as the feature quantity obtained in step S33 of the automatic key attachment function deriving process subroutine.

In step S49, the automatic key attachment function stored in the automatic key attachment function storing section 52 is read by the keyword estimating section 54, and the feature quantity obtained in step S48 is substituted into this read automatic key attachment function, thereby obtaining the image quantity. Then, an appropriate keyword is estimated on the basis of this obtained image quantity.

It is to be noted that the above estimation is executed by selecting a keyword of which the image quantity closest to the image quantity obtained from the automatic key attachment function (image quantity by the same criterion) is defined.

In step S50, the above estimated keyword is set as a piece of attachment information of the objective image data to be registered and retained in, for example, a register (not shown).

It is decided in step S51 whether or not a manual input of the above attachment information is designated by the user from the input section 1. Consequently, when it is designated, the program flow proceeds to Step S52. When it is not designated, the program flow proceeds to Step S53.

In step S52, an attachment information input process as described in detail later is executed interactively with the user.

In step S53, the attachment information retained in the register is read, and the objective image data to be registered is stored into the image data storing section 6 together with this read attachment information.

Subsequently, the image data registering process subroutine ends, and the program flow returns to the main routine shown in FIG. 4.

Thus, only with the designation of the "automatic key attachment mode" performed by the user from the input section 1, a keyword suited to the feature quantity of the objective image data to be registered is automatically estimated and attached to the image data.

When a difference between the image quantity of the estimated keyword and the image quantity obtained from the automatic key attachment function is not smaller than a specified value in estimating the keyword in step S49, it is acceptable to decide that there is no keyword to be attached, display the fact on the display section 9 and skip the step S50.

Figure 10:
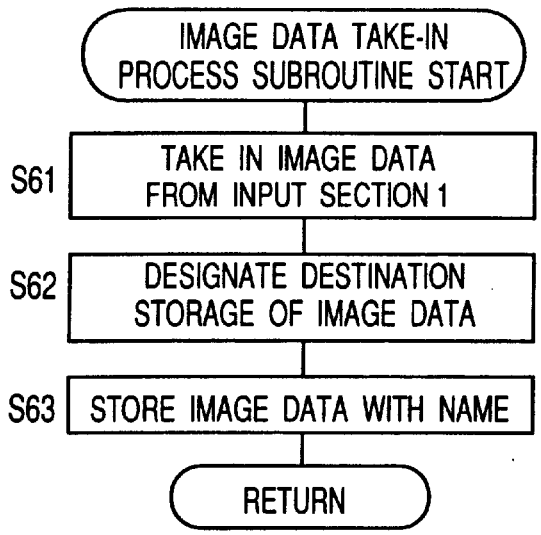
FIG. 10 is a flowchart of an image data take-in process subroutine to be executed during the image data registering process shown in FIG. 9.

FIG. 10 is a flowchart of an image data take-in process subroutine to be executed in step S45 of the image data registering process subroutine shown in FIG. 9. The image data take-in process operation will be described in detail below with reference to FIG. 1 and FIG. 10.

When it is decided that a "new input" is designated in step S44 of the image data registering process subroutine shown in FIG. 9, the image data take-in process subroutine starts.

In step S61, new image data is taken in from the input section 1 (the image input device such as the scanner 18 or the CD-ROM drive 19b or the image data storage medium such as the hard disk unit 16).

In step S62, a destination storage such as a work memory for storing the image data taken in is designated.

In step S63, the image data taken in is provided with an image data name set by the user from the input section 1 and then stored into the work memory.

Thereafter, the image data take-in process subroutine ends and the program flow returns to the image data registering process subroutine shown in FIG. 9.

Figure 11:
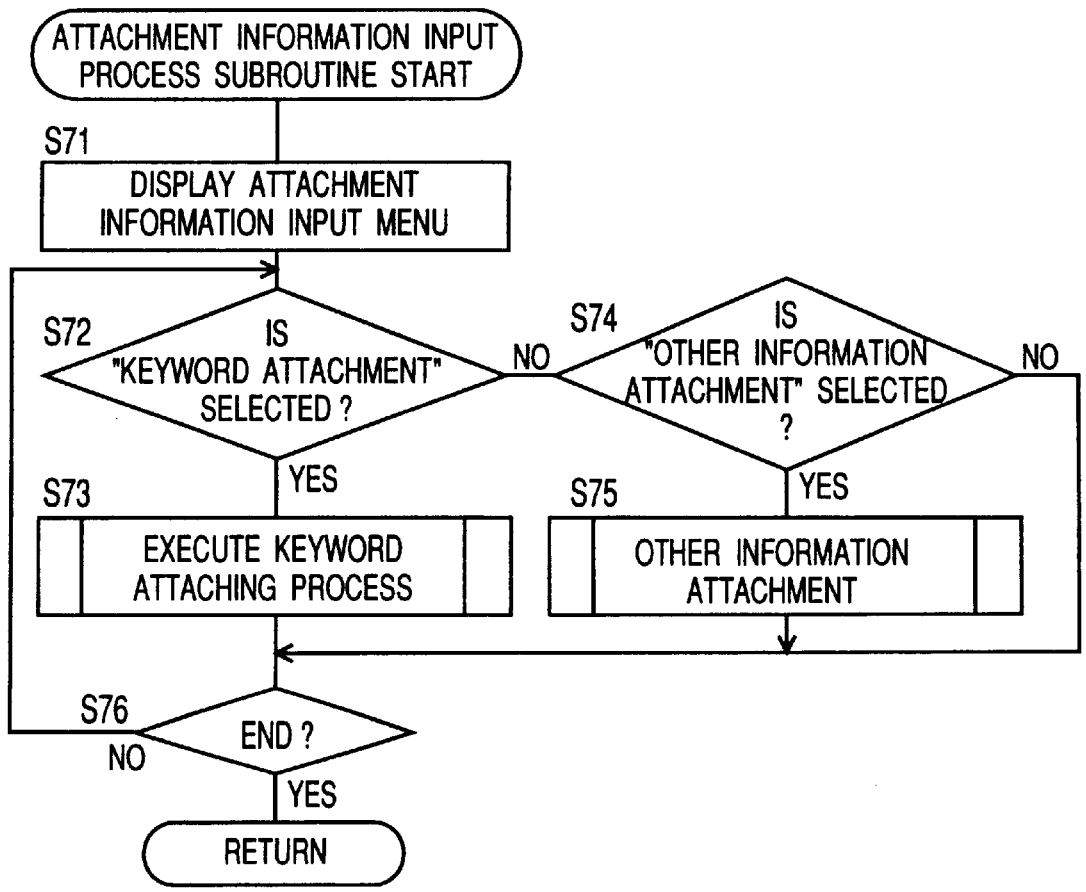
FIG. 11 is a flowchart of an attachment information input process subroutine to be executed during the image data registering process shown in FIG. 9.

FIG. 11 is a flowchart of an attachment information input process subroutine to be executed in step S52 of the image data registering process subroutine shown in FIG. 9. The attachment information input process operation will be described in detail below with reference to FIG. 1 and FIG. 11.

When it is decided that an "attachment information manual input" is designated in step S51 of the image data registering process subroutine shown in FIG. 9, the attachment information input process subroutine starts.

In step S71, display of an attachment information input menu is displayed on the display section 9.

When it is decided in step S72 that an attachment information input menu "keyword attachment" is selected, the program flow proceeds to Step S73. Otherwise, the program flow proceeds to Step S74.

In step S73, a keyword attaching process as described in detail later is executed according to the selected attachment information input menu "keyword attachment". Thereafter, the program flow proceeds to Step S76.

When it is decided in step S74 that an attachment information input menu "other information attachment" is selected, the program flow proceeds to Step S75. Otherwise, the program flow proceeds to Step S76.

In step S75, the attachment information inputted from the input section 1 is taken in according to the selected attachment information input menu "other attachment information" and retained in the register as a piece of attachment information of the image data.

It is decided in step S76 whether or not the attachment information input process is to end interactively with the user. Consequently, when the process is to end, the attachment information input process subroutine ends, and the program flow returns to the image data registering process subroutine shown in FIG. 9. When the process is not to end, the program flow returns to step S72 and proceeds to the next menu processing.

As described above, keywords other than the keyword estimated in step S49 of the image data registering process subroutine and the attachment information of the author name, the date of creation, the date of registration, size, comments and so on of the data other than the keyword are manually inputted by the user.

Figure 12:
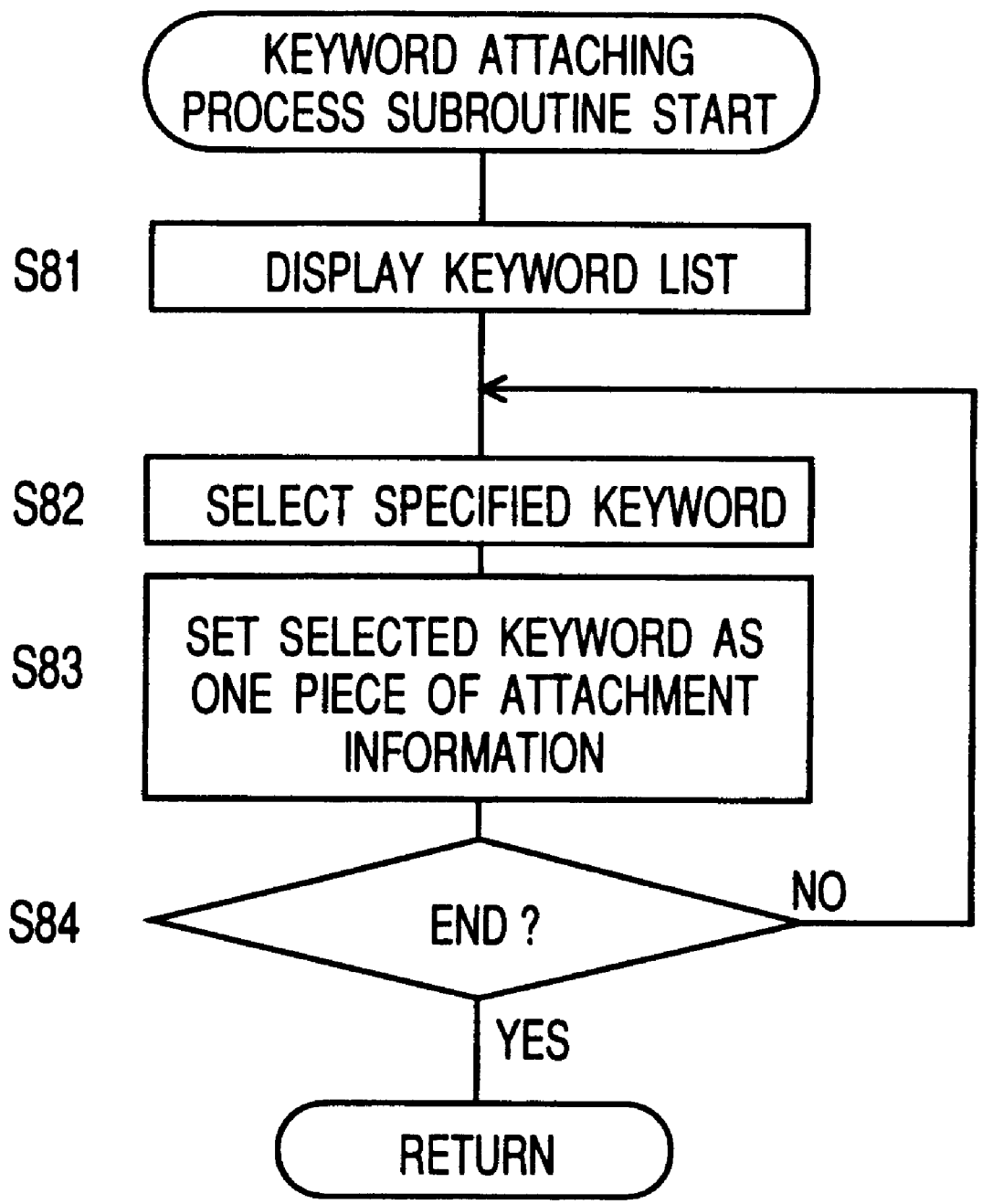
FIG. 12 is a flowchart of a keyword attaching process subroutine to be executed during the attachment information input process shown in FIG. 11.

FIG. 12 is a flowchart of a keyword attaching process subroutine to be executed in step S73 of the attachment information input process subroutine shown in FIG. 11. The keyword attaching process operation will be described in detail below with reference to FIG. 1 and FIG. 12.

When it is decided that the attachment information input menu "keyword attachment" is selected in step S72 of the attachment information input process subroutine shown in FIG. 11, the keyword attaching process subroutine starts.

In step S81, the keywords registered in the keyword storing section 3 are displayed in a list form on the display section 9.

In step S82, a specified keyword is selected from the displayed keywords interactively with the user.

In step S83, the selected keyword is set as a piece of attachment information and retained in the register.

In step S84, it is decided whether or not the keyword attaching process is to end interactively with the user. Consequently, when the process is not to end, the program flow returns to step S82 and proceeds to the next keyword selection. When the process is to end, the keyword attaching process subroutine ends, and the program flow returns to the attachment information input process subroutine shown in FIG. 11.

As described above, in the present embodiment, the feature quantity of the reference image selected from the image data storing section 6 is obtained by the automatic key attachment function deriving section 51, and the automatic key attachment function is derived from the image quantity of the keyword attached to this reference image and the obtained feature quantity. The thus-derived automatic key attachment function is stored into the automatic key attachment function storing section 52.

On the other hand, the image data registering section 5 has the feature quantity calculating section 53 and the keyword estimating section 54. When registering the objective image data to be registered into the image data storing section 6, the feature quantity of the objective image to be registered is calculated by the feature quantity calculating section 53. Then, the keyword estimating section 54 obtains the image quantity by substituting this calculated feature quantity into the automatic key attachment function, and the keyword of the objective image to be registered is estimated and attached to the image data based on this obtained image quantity.

As described above, according to the present embodiment, by merely setting the image quantity of the objective keyword to be registered in the keyword registering stage, the deriver of the automatic key attachment function and the keyword attachment based on this derived automatic key attachment function are automatically executed.

Therefore, no such troublesome operation of preparatorily setting the optimum fidelity calculation information and the threshold value every keyword candidate as in the prior art keyword attaching method disclosed in Japanese Patent Laid-Open Publication No. HEI 6-295318 is required.

When estimating the keyword to be attached, it is not required to execute an operation for deciding whether or not the keywords registered in the keyword storing section 3 are each appropriate as a keyword to be attached to the registration image data in estimating the keyword to be attached, so that the keyword attachment can be achieved in a short time even when a large number of keywords are registered in the keyword storing section 3.

Also, the automatic key attachment function to be used in attaching the keyword is derived on the basis of the feature quantity of the reference image and the image quantity of the keyword. Therefore, by designating reference images of which the field of use or application is identical as the reference image, an appropriate keyword corresponding to the field of use or application can be attached.

It is to be noted that the aforementioned embodiment has been described taking the case where a keyword is attached to the image data as an example. However, the present invention is not limited to this, and it can be also applied to a case where a keyword is attached to audio data or multimedia data of a combination of image data and audio data. What is essential is that the data is required to be the data of which the feature quantity representing the features of the data contents can be extracted.

The automatic key attachment function is derived by the multiple regression analysis method in the case where one keyword is attached to the reference image in the aforementioned embodiment. However, even in a case where a plurality of keywords are attached to a reference image, the automatic key attachment function can be derived by, for example, another multivariate analysis method such as canonical correlation analysis. When a plurality of keywords are attached to the reference image, an average value of the image quantities of the plurality of keywords can also be adopted as the image quantity concerning the reference image.

Figure 13:
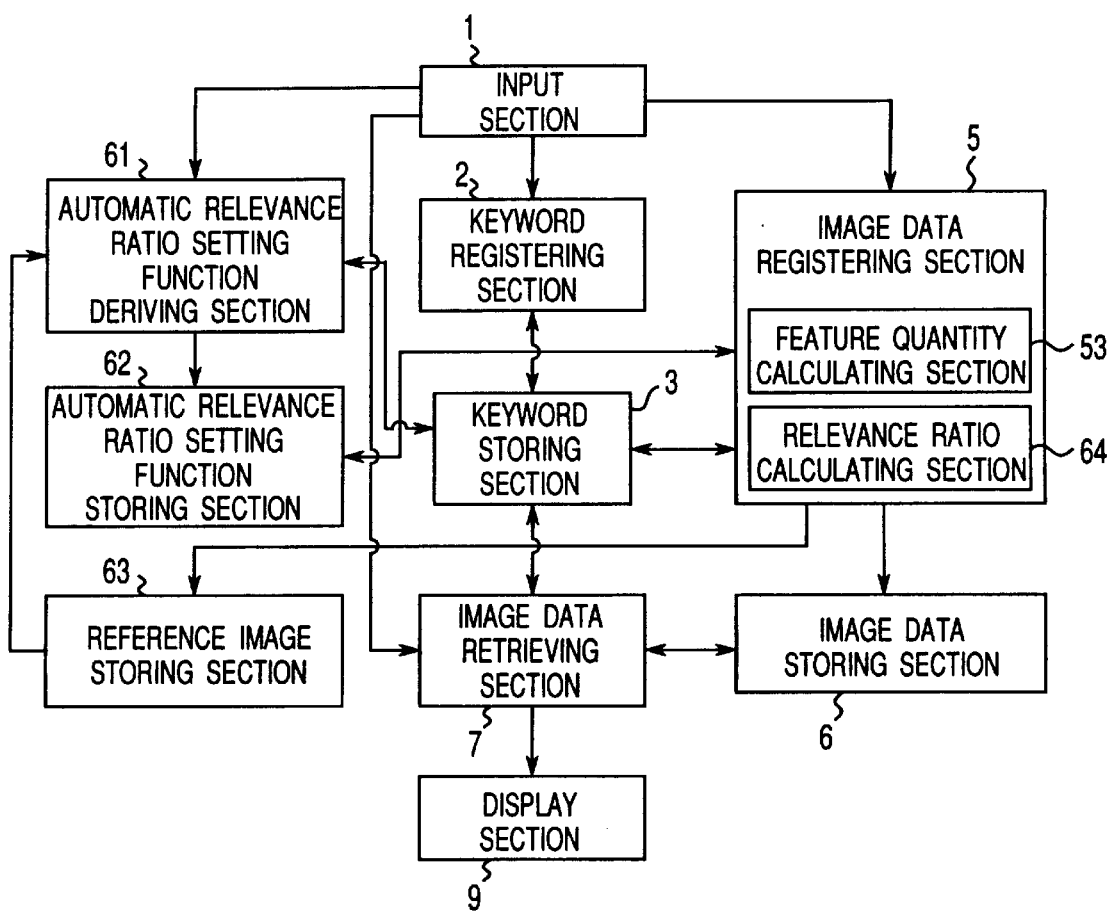
FIG. 13 is a functional block diagram of a retrieving device mounted with an object-to-key relevance ratio automatic attaching device according to an embodiment of the present invention.

FIG. 13 is a functional block diagram of a retrieving device mounted with an object-to-key relevance ratio automatic attaching device of the present embodiment. In the present embodiment, image data is used as the aforementioned "object", and a keyword is used as the aforementioned "key".

The retrieving device shown in FIG. 13 has the same blocks except for the automatic key attachment function deriving section 51, the automatic key attachment function storing section 52 and the keyword estimating section 54 in the image data registering section 5 of the retrieving device described with reference to FIG. 1. Therefore, same blocks are denoted by same reference numerals, and no description will be provided for them.

An automatic relevance ratio setting function deriving section 61 derives a function for automatically attaching a relevance ratio with respect to the already registered keyword to the objective image to be registered (i.e., for executing an automatic relevance ratio setting process) (the function referred to as an automatic relevance ratio setting function hereinafter) and stores the function into an automatic relevance ratio setting function storing section 62 based on the keyword of the reference image that is designated from the input section 1 and read from the reference image storing section 63 as described in detail later.

The image data registering section 5 has a feature quantity calculating section 53 and a relevance ratio calculating section 64. The feature quantity calculating section 53 operates, based on objective image data to be registered inputted from the input section 1, to calculate the feature quantity of the image. Then, the relevance ratio calculating section 64 operates, based on the calculated feature quantity and the automatic relevance ratio setting function, to calculate the relevance ratio of the objective image to be registered with respect to the already registered keywords registered in the keyword storing section 3.

That is, in the present embodiment, the image data registering section 5 constitutes the object registering section, the automatic relevance ratio setting function deriving section 61 constitutes the relational expression deriving section, and the automatic relevance ratio setting function storing section 62 constitute the relational expression storing section.

A hardware construction for implementing the function shown in FIG. 13 is quite the same as the one described with reference to FIG. 2 and FIG. 3, and therefore, no description is provided therefor.

The fundamental processing operation of the retrieving device having the above construction is the same as the operation described with reference to FIG. 4 except for the point that the automatic key attachment function deriving process in step S9 shown in FIG. 4 is replaced by an automatic relevance ratio setting function deriving process described later with reference to FIG. 14. The keyword registering process subroutine in step S7 shown in FIG. 4 is the same as the one described with reference to FIG. 5, and the image quantity in step S22 shown in FIG. 5 is the same as the one described with reference to FIG. 6. Therefore, no such figures and description are provided.

Figure 14:
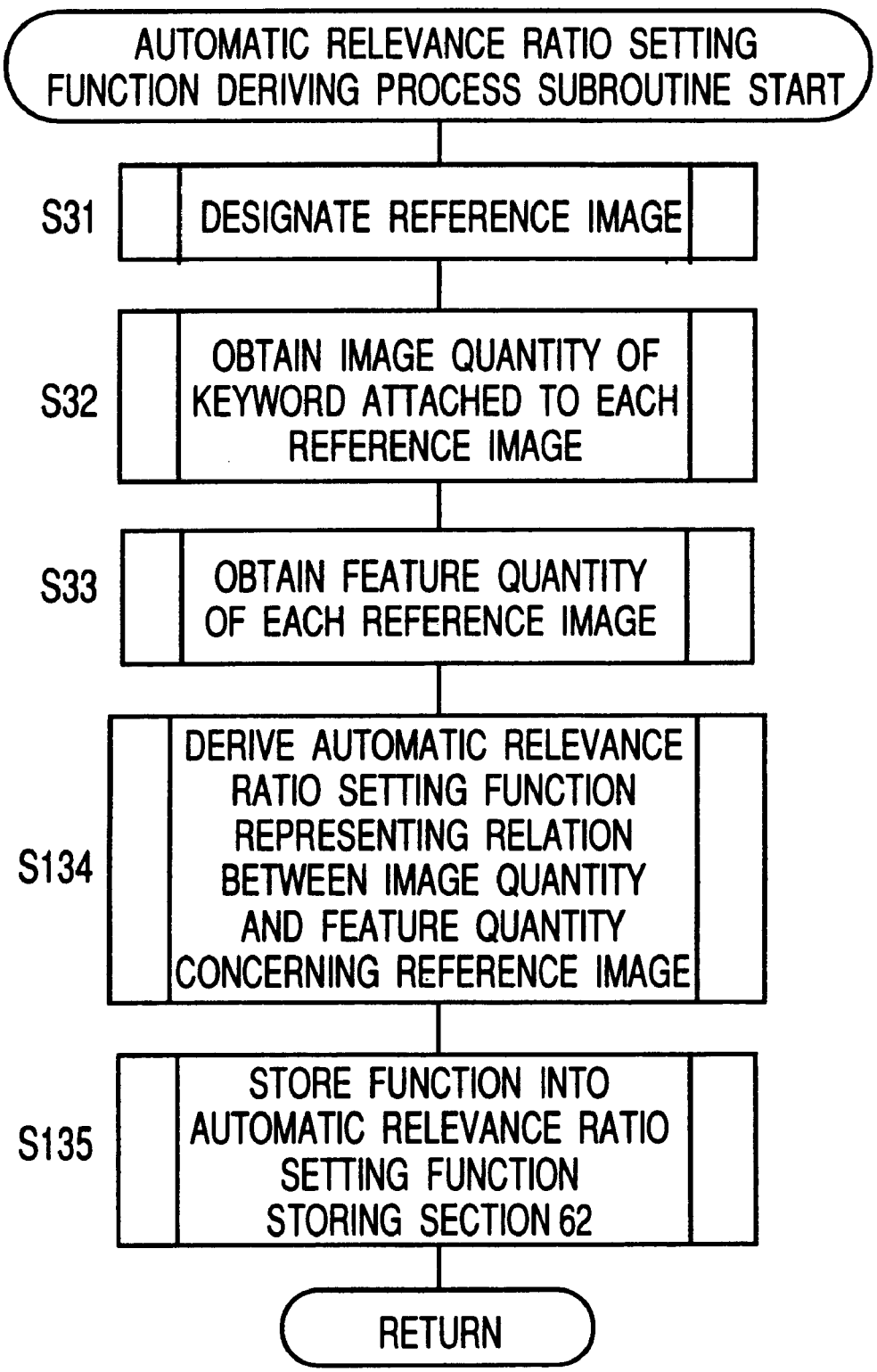
FIG. 14 is a flowchart of an automatic relevance ratio setting function deriving process subroutine to be executed by an automatic relevance ratio setting function deriving section as shown in FIG. 13.

FIG. 14 is a flowchart of an automatic relevance ratio setting function deriving process subroutine which is to be executed by the automatic relevance ratio setting function deriving section 61 (see FIG. 13) and substitutes for the step S9 shown in FIG. 4. The automatic relevance ratio setting function deriving process operation will be described in detail below with reference to FIG. 13 and FIG. 14.

It is to be noted that steps other than steps S134 and S135 shown in FIG. 14 have the same processes as those designated by the same reference numerals in FIG. 7.

In step S31, an image to be referred to (referred to as a reference image hereinafter) is designated from the image data registered in the reference image storing section 63 interactively with the user. This reference image designating method is not specifically limited, and for example, it is proper to display the image data name of all the image data registered in the reference image storing section 63 in a list form on the display section 9 and designate one from the input section 1. It is also acceptable to refer to all the registered images or automatically select at random a specified number of registered images and refer to them. In step S32, the reference image storing section 63 is referred to, and the keyword attached to the designated reference image is read. Then, the keyword storing section 3 is referred to, and the image quantity of the read keyword is obtained.

In step S33, the feature quantity of the designated reference image is obtained. As the feature quantity in this case, there can be enumerated a variety of feature quantities of, for example, the feature quantities concerning the color of brightness, hue, chroma and so on, and feature quantities concerning the contour features or shape features of straight line content, circular shape content and so on, however, the feature quantity is not specifically limited.

In step S134, with regard to each reference image designated in step S31, the automatic relevance ratio setting function which is the relational expression of the image quantity obtained in step S32 and the feature quantity obtained in step S33 is derived by a multivariate analysis. It is to be noted that the multivariate analysis is not specifically limited and exemplified by a multiple regression analysis or the like. It is to be noted that the deriver of this automatic relevance ratio setting function is executed every image quantity of an identical criterion. In step S135, the derived automatic relevance ratio setting function is stored into the automatic relevance ratio setting function storing section 62. Thereafter, the automatic relevance ratio setting function deriving process subroutine ends, and the program flow returns to the main routine of the fundamental processing operation shown in FIG. 4.

The method of deriving the automatic relevance ratio setting function by a multiple regression analysis is the same as that described with reference to FIG. 8, and therefore, no description is provided therefor.

Figure 15:
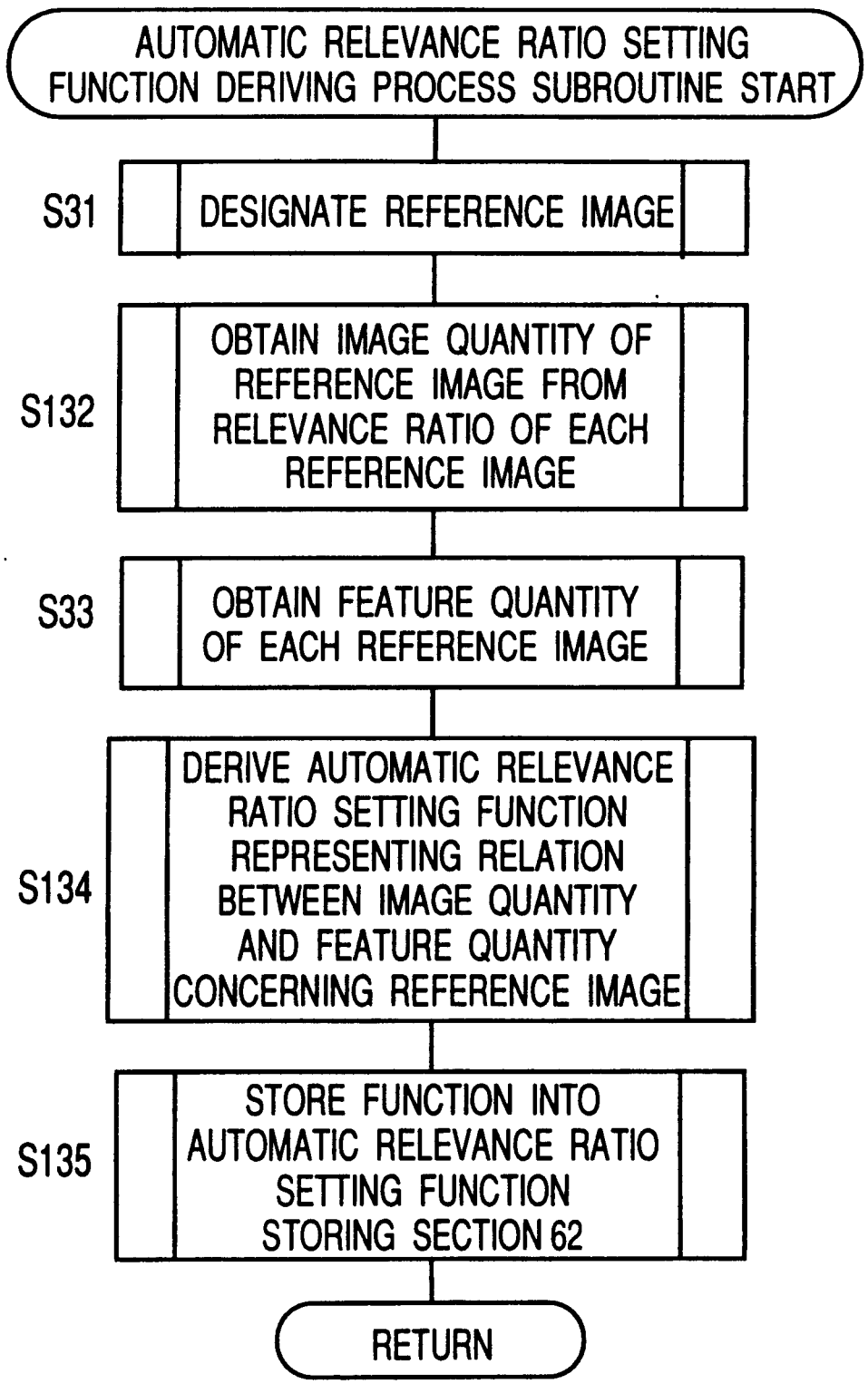
FIG. 15 is a flowchart of an automatic relevance ratio setting function deriving process subroutine different from that of FIG. 14.

In the automatic relevance ratio setting function deriving process subroutine shown in FIG. 14, the automatic relevance ratio setting function is derived by referring to the image data registered in the reference image storing section 63 with a keyword attached to it. However, it is also acceptable to derive the function by referring to the image data registered in the image data storing section 6 with a relevance ratio to the already registered keyword attached to it. FIG. 15 is a flowchart of an automatic relevance ratio setting function deriving subroutine in the case. In this flowchart, the same processes as those of the steps denoted by the same reference numerals in FIG. 14 are executed except for step S132. This automatic relevance ratio setting function deriving process operation will be described below.

In step S31, a reference image to be referred to is designated from the image data registered in the image data storing section 6 interactively with the user. In step S132, the image data storing section 6 is referred to, and the relevance ratio of the keyword attached to each designated reference image with respect to the keyword is read. Then, the keyword storing section 3 is referred to, and the image quantity of each reference image is obtained on the basis of the relevance ratio of each reference image and the image quantity of the already registered keyword.

In step S33, the feature quantity of each reference image is obtained. In step S134, the automatic relevance ratio setting function that is the relational expression of the image quantity obtained in step S132 and the feature quantity obtained in step S33 is derived by a multivariate analysis. In step S135, the derived automatic relevance ratio setting function is stored into the automatic relevance ratio setting function storing section 62. Thereafter, the automatic relevance ratio setting function deriving process subroutine ends, and the program flow returns to the main routine of the fundamental processing operation shown in FIG. 4.

As described above, utilizing the image registered in the image data storing section 6 as the reference image obviates the need for the formation of a special image to be referred to in the relevance ratio calculating stage and the registration of the image into the reference image storing section 63. This leads to the saving of the time required for the formation of the special reference image and the memory region in which the image is stored.

Figure 16:
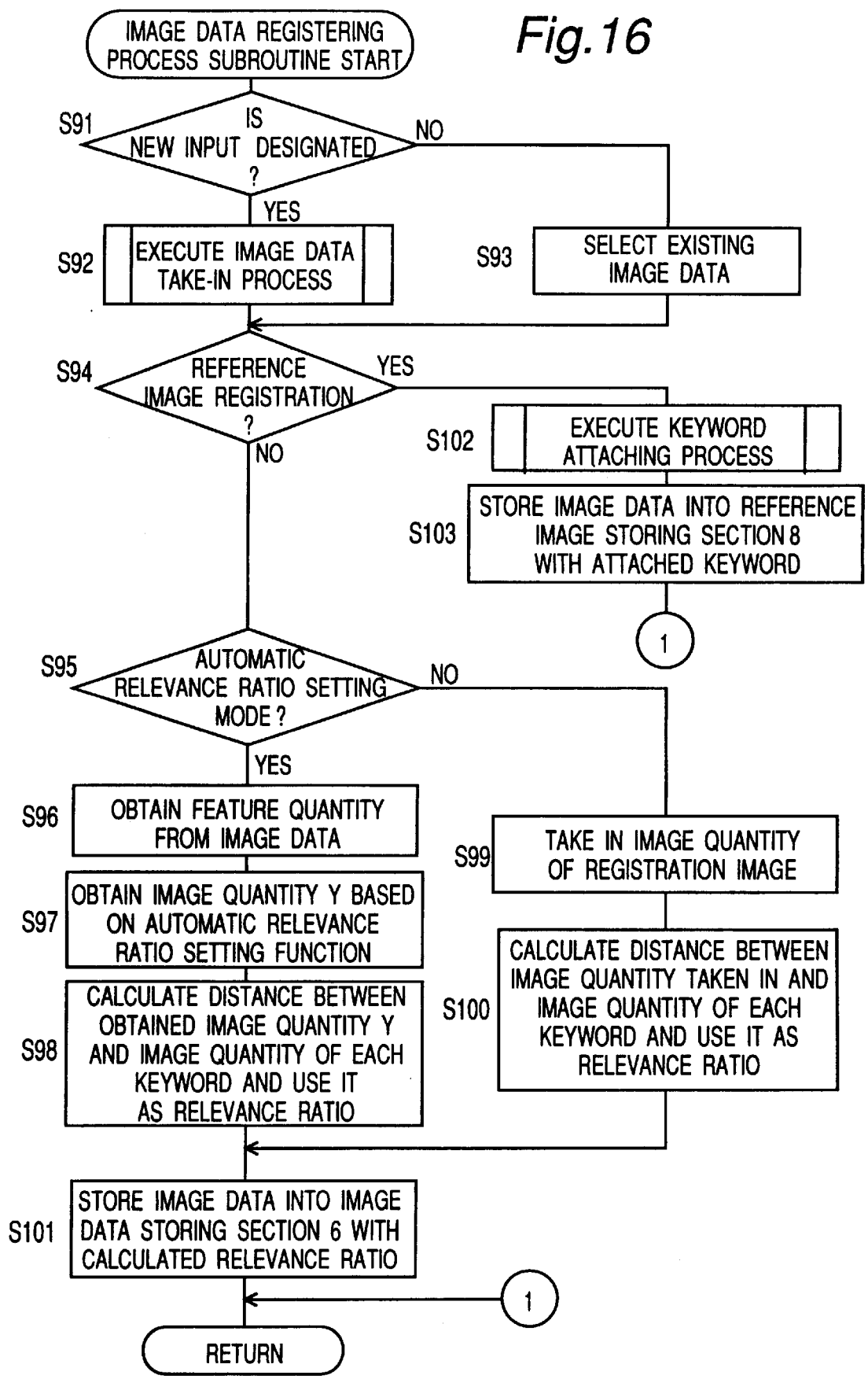
FIG. 16 is a flowchart of an image data registering process subroutine to be executed by an image data registering section as shown in FIG. 13.

FIG. 16 is a flowchart of an image data registering process subroutine to be executed by the image data registering section 5 (see FIG. 13) having the feature quantity calculating section 53 and the relevance ratio calculating section 64 in step S5 of the fundamental processing operation shown in FIG. 4. The image data registering process operation will be described in detail below with reference to FIG. 16. When it is decided that the job menu "data registration" is selected in step S4 of the main routine of the fundamental processing operation shown in FIG. 4, the image data registering process subroutine starts.

In step S91, it is decided whether or not the "new input" for newly registering image data is designated by the user from the input section 1. Consequently, when it is designated, the program flow proceeds to Step S92. When it is not designated, the program flow proceeds to Step S93. In step S92, an image data take-in process as described in detail later is executed. Thereafter, the program flow proceeds to Step S94. In step S93, the existing image data is selected and read.

In step S94, it is decided whether or not a reference image (image used for deriving the automatic relevance ratio setting function) is to be registered into the reference image storing section 63 interactively with the user. Consequently, when a reference image is to be registered, the program flow proceeds to Step S102. Otherwise, the program flow proceeds to Step S95. In step S95, it is decided whether or not the registration mode is an automatic relevance ratio setting mode for registering the objective image data to be registered with the relevance ratio with respect to the registered keyword automatically attached interactively with the user. Consequently, when the mode is the automatic relevance ratio setting mode, the program flow proceeds to Step S96. Otherwise, the program flow proceeds to Step S99. In step S96, the feature quantity is calculated by the feature quantity calculating section 53 from the new image data taken in in step S92 or the existing image data read in step S93. It is to be noted that the feature quantity is the same feature quantity as the feature quantity obtained in step S33 (see FIG. 14) of the automatic relevance ratio setting function deriving process subroutine.

In step S97, the automatic relevance ratio setting function stored in the automatic relevance ratio setting function storing section 62 is read by the relevance ratio calculating section 64, and the feature quantity obtained in step S96 is substituted into the variables $x_1$ through $x_5$ of the read automatic relevance ratio setting function, so that an image quantity y is obtained. In step S98, a distance between the obtained image quantity y and the image quantity of each keyword stored in the keyword storing section 3 is calculated as a relevance ratio of the objective image to be registered with respect to each keyword. Thereafter, the program flow proceeds to Step S101.

In step S99, the image quantity of the registration image set from the input section 1 is taken in interactively with the user. In step S100, a distance between the image quantity taken in and the image quantity of each keyword stored in the keyword storing section 3 is calculated as the relevance ratio of the registration image with respect to each keyword. In step S101, the objective image data to be registered is stored into the image data storing section 6 together with each calculated relevance ratio. Thereafter, the image data registering process subroutine ends, and the program flow returns to the main routine shown in FIG. 4. Thus, to the objective image data to be registered is attached the relevance ratio of this image with respect to the already registered keyword.

In step S102, a keyword attaching process as described in detail later is executed. In step S103, the objective image data to be registered is stored into the reference image storing section 63 together with the keyword attached in step S102. Thereafter, the image data registering process subroutine ends, and the program flow returns to the main routine shown in FIG. 4.

The image data take-in process subroutine executed in step S92 of the image data registering process subroutine (see FIG. 16) and the keyword attaching process subroutine executed in step S102 are the same as those of the flowcharts shown in FIG. 10 and FIG. 12 described before, and therefore, no description is provided for them.

It is to be noted that the image data registering section 5 shown in FIG. 13 has the relevance ratio calculating section 64 in place of the keyword estimating section 54 shown in FIG. 1 in these subroutines, and therefore, only the process in the relevance ratio calculating section 64 differs from the processes of FIG. 10 and FIG. 12 described before. Therefore, this different process will only be described.

The image data registering section 5 has the feature quantity calculating section 53 and the relevance ratio calculating section 64. When registering the objective image data to be registered into the image data storing section 6, the feature quantity of the objective image to be registered is calculated by the feature quantity calculating section 53. Then, the relevance ratio calculating section 64 obtains the image quantity y by substituting this calculated feature quantity into the automatic relevance ratio setting function and calculates a distance between the image quantity y and the image quantity of each keyword stored in the keyword storing section 3. Then, the value of this calculated distance is attached to the image data of the objective image to be registered as the relevance ratio of the objective image to be registered with respect to the already registered keyword.

As described above, according to the present embodiment, by merely setting the image quantity of the objective keyword to be registered in the keyword registering stage, the deriver of the automatic relevance ratio setting function and the attachment of the relevance ratio of the objective image to be registered with respect to the already registered keyword based on this derived automatic relevance ratio setting function are automatically executed. This arrangement does not require the troublesome operation of registering the relevance ratio of every image data to be registered with respect to all the already registered keywords through one-by-one setting in registering the image data, thereby allowing the image registering process to be efficiently executed.

The automatic relevance ratio setting function for use in attaching the relevance ratio is derived on the basis of the feature quantity of the reference image and the image quantity of the keyword or on the basis of the relevance ratio of the feature quantity of the reference image with respect to the already registered keyword. Therefore, by designating reference images of which the field of use or application is identical as the reference image, an appropriate relevance ratio corresponding to the field of use or application can be attached.

In the above embodiment, the automatic relevance ratio setting function is derived by the multiple regression analysis method in the case where one keyword is attached to the reference image. However, the automatic relevance ratio setting function can be derived by applying another multivariate analysis method such as a canonical correlation analysis to a case where a plurality of keywords are attached to the reference image. It is otherwise possible to adopt the average value of the image quantities of a plurality of keywords as the image quantity concerning the reference image when the plurality of keywords are attached to the reference image. Although the key to be attached is the keyword in the above embodiment, the present invention can be applied to any object (for example, an icon simply displaying a picture image or the like) so long as it is a key for retrieval.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A keyword attaching method, comprising:
   registering a keyword and an image quantity obtained by numerically converting a linguistic sense of the keyword by a specified criterion into a keyword storing section with a correspondence provided between the keyword and the image quantity;
   referring to an object to which the keyword is attached and deriving, from the image quantity of the keyword attached to the object to be referred to and a feature quantity of the object to be referred to, a relational expression of the image quantity and the feature quantity;
   calculating the feature quantity of the object to be registered;
   obtaining the image quantity based on the calculated feature quantity and the relational expression and estimating the keyword to be attached to the object to be registered referring to the keyword storing section based on the obtained image quantity; and
   storing into an object storing section the estimated keyword and the object to be registered with a correspondence provided between the keyword and the object.

2. A keyword attaching method as claimed in claim 1, wherein
   the relational expression is derived by a multivariate analysis using p feature quantities obtained for each of n objects to be referred to as explanatory variables and using image quantities of n keywords as an objective variable.

3. A keyword automatic attaching device, comprising:
   a keyword storing section which registers a keyword and an image quantity obtained by numerically converting a linguistic sense of the keyword by a specified criterion with a correspondence provided between the keyword and the image quantity;
   a relational expression deriving section which refers to an object to which a keyword is attached and derives, from the image quantity of the keyword attached to the object to be referred to and a feature quantity of the object to be referred to, a relational expression of the image quantity and the feature quantity and stores the derived relational expression into a relational expression storing section;
   a feature quantity calculating section which calculates the feature quantity of the object to be registered;
   a keyword estimating section which obtains the image quantity based on the calculated feature quantity and the relational expression and estimates a keyword to be attached to the object to be registered referring to the keyword storing section based on the obtained image quantity; and
   an object registering section which registers into an object storing section the estimated keyword and the object to be registered with a correspondence provided between the keyword and the object.

4. A keyword automatic attaching device as claimed in claim 3, wherein
   the relational expression deriving section derives the relational expression by a multivariate analysis using p feature quantities obtained for each of n objects to be referred to as explanatory variables and using image quantities of n keywords as an objective variable.

5. A storage medium storing an information processing program, the program comprising:
   registering a keyword and an image quantity obtained by numerically converting a linguistic sense of the keyword by a specified criterion into a keyword storing section with a correspondence provided between the keyword and the image quantity;
   referring to an object to which the keyword is attached and deriving, from the image quantity of the keyword attached to the object to be referred to and a feature quantity of the object to be referred to, a relational expression of the image quantity and the feature quantity;
   calculating the feature quantity of the object to be registered;
   obtaining the image quantity based on the calculated feature quantity and the relational expression and estimating the keyword to be attached to the object to be registered referring to the keyword storing section based on the obtained image quantity; and
   storing into an object storing section the estimated keyword and the object to be registered with a correspondence provided between the keyword and the object.

6. A program storage medium as claimed in claim 5, wherein deriving the relational expression includes executing a multivariate analysis using p feature quantities obtained for each of n objects to be referred to as explanatory variables and using image quantities of n keywords as an objective variable.

7. A program storage medium storing therein an information processing program, comprising:
   registering a keyword and an image quantity obtained by numerically converting a linguistic sense of the keyword by a specified criterion into a keyword storing section with a correspondence provided between the keyword and the image quantity;
   referring to an object to which the keyword is attached and deriving, from the image quantity of the keyword attached to the object to be referred to and a feature quantity of the object to be referred to, a relational expression of the image quantity and the feature quantity;
   calculating the feature quantity of the object to be registered;
   obtaining the image quantity based on the calculated feature quantity and the relational expression and estimating the keyword to be attached to the object to be registered referring to the keyword storing section based on the obtained image quantity; and storing into an object storing section the estimated keyword and the object to be registered with a correspondence provided between the keyword and the object.

8. A program storage medium as claimed in claim 7, wherein the relational expression is derived by a multivariate analysis using p feature quantities obtained for each of n objects to be referred to as explanatory variables and using image quantities of n keywords as an objective variable.

9. An object-to-key relevance ratio attaching method, comprising:

registering a key and an image quantity obtained by numerically converting a linguistic sense of the key by a specified criterion into a key storing section with a correspondence provided between the key and the image quantity;

referring to an object to which the key is attached and deriving, from the image quantity of the key attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and calculating a relevance ratio of the object to be registered with respect to an already registered key referring to the key storing section based on the obtained image quantity; and storing into an object storing section the calculated relevance ratio and the object to be registered with a correspondence provided between the relevance ratio and the object.

10. An object-to-key relevance ratio attaching method as claimed in claim 9, wherein the relational expression is derived by a multivariate analysis using p feature quantities obtained for each of n objects to be referred to as explanatory variables and using image quantities of n keys as an objective variable.

11. An object-to-key relevance ratio automatic attaching device, comprising:

a key storing section which registers a key and an image quantity obtained by numerically converting a linguistic sense of the key by a specified criterion with a correspondence provided between the key and the image quantity;

a relational expression deriving section which refers to an object already registered and derives, from attachment information of the object to be referred to and a feature quantity of the object to be referred to, a relational expression of the image quantity and the feature quantity and stores the derived relational expression into a relational expression storing section;

a feature quantity calculating section which calculates the feature quantity of the object to be registered;

a relevance ratio calculating section which obtains the image quantity based on the calculated feature quantity and the relational expression and calculates a relevance ratio of the object to be registered with respect to the already registered key referring to the key storing section based on the obtained image quantity; and an object registering section which registers into an object storing section the calculated relevance ratio and the object to be registered with a correspondence provided between the relevance ratio and the object.

12. An object-to-key relevance ratio automatic attaching device as claimed in claim 11, wherein the relational expression deriving section derives the relational expression by a multivariate analysis using p feature quantities obtained for each of n objects to be referred to as explanatory variables and using image quantities of n keys as an objective variable.

13. A program storage medium storing an information processing program, the program comprising:

registering a key and an image quantity obtained by numerically converting a linguistic sense of the key by a specified criterion into a key storing section with a correspondence provided between the key and the image quantity;

referring to an object to which the key is attached and deriving, from the image quantity of the key attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and calculating a relevance ratio of the object to be registered with respect to an already registered key referring to the key storing section based on the obtained image quantity; and storing into an object storing section the calculated relevance ratio and the object to be registered with a correspondence provided between the relevance ratio and the object.

14. A program storage medium as claimed in claim 13, wherein deriving the relational expression includes executing a multivariate analysis using p feature quantities obtained for each of n objects to be referred to as explanatory variables and using image quantities of n keys as an objective variable.

15. A program storage medium storing an information processing program, comprising:

registering a key and an image quantity obtained by numerically converting a linguistic sense of the key by a specified criterion into a key storing section with a correspondence provided between the key and the image quantity;

referring to an object to which the key is attached and deriving, from the image quantity of the key attached to the object to be referred to and a feature quantity of the object to be referred to, a relational expression of the image quantity and the feature quantity;

calculating the feature quantity of the object to be registered;

obtaining the image quantity based on the calculated feature quantity and the relational expression and calculating a relevance ratio of the object to be registered with respect to an already registered key referring to the key storing section based on the obtained image quantity; and storing into an object storing section the calculated relevance ratio and the object to be registered with a correspondence provided between the relevance ratio and the object.

16. A program storage medium as claimed in claim 15, wherein the relational expression is derived by a multivariate analysis using p feature quantities obtained for each of n objects to be referred to as explanatory variables and using image quantities of n keys as an objective variable.

17. An object-to-key relevance ratio attaching method, comprising:

deriving, from a feature quantity of an object to which a key is attached and an image quantity of the key attached to this object, a relational expression of the image quantity and the feature quantity;

calculating a relational expression of the object and the key based on the derived relational expression; and calculating a relevance ratio of the object with respect to the key based on the calculated relational expression and storing into an object storing section the calculated relevance ratio and the object with a correspondence provided between the relevance ratio and the object.

18. An object-to-key relevance ratio attaching method as claimed in claim 17, wherein the relational expression is derived by a multivariate analysis using p feature quantities obtained for each of n objects to be referred to as explanatory variables and using image quantities of n keys as an objective variable.

19. An object-to-key relevance ratio attaching device, comprising:

a relational expression deriving section which derives, from a feature quantity of an object to which a key is attached and an image quantity obtained by numerically converting the key attached to the object, a relational expression of the image quantity and the feature quantity and stores the derived relational expression into a relational expression storing section;

a relevance ratio calculating section which calculates a relevance ratio of the object with respect to the key based on the derived relational expression; and an object registering section which registers into an object storing section the calculated relevance ratio and the object with a correspondence provided between the relevance ratio and the object.

20. An object-to-key relevance ratio attaching device as claimed in claim 19, wherein the relational expression deriving section derives the relational expression by a multivariate analysis using p feature quantities obtained for each of n objects as explanatory variables and using image quantities of n keys as an objective variable.

21. A program storage medium storing an information processing program, the program comprising:

deriving from a feature quantity of an object to which a key is attached and an image quantity obtained by numerically converting the key attached to the object, a relational expression of the image quantity and the feature quantity;

calculating a relational expression of the object and the key based on the derived relational expression; and calculating a relevance ratio of the object with respect to the key based on the calculated relational expression and storing into an object storing section the calculated relevance ratio and the object with a correspondence provided between the relevance ratio and the object.

22. A program storage medium as claimed in claim 21, wherein deriving the relational expression includes executing a multivariate analysis using p feature quantities obtained for each of n objects as explanatory variables and using image quantities of n keys as an objective variable.

* * * * *